(12) United States Patent
Nakamura et al.

(10) Patent No.: US 12,397,712 B2
(45) Date of Patent: Aug. 26, 2025

(54) VEHICULAR CAMERA

(71) Applicant: Panasonic Intellectual Property Management Co., Ltd., Osaka (JP)

(72) Inventors: Ken Nakamura, Kanagawa (JP); Yuichiro Aihara, Kanagawa (JP); Koyo Usami, Kanagawa (JP); Masayoshi Michiguchi, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 54 days.

(21) Appl. No.: 18/411,967

(22) Filed: Jan. 12, 2024

(65) Prior Publication Data

US 2024/0246488 A1 Jul. 25, 2024

(30) Foreign Application Priority Data

Jan. 19, 2023 (JP) ................................. 2023-006337
Mar. 28, 2023 (JP) ................................. 2023-050761

(51) Int. Cl.
*B60R 1/27* (2022.01)
*H04N 23/51* (2023.01)
(Continued)

(52) U.S. Cl.
CPC ............... *B60R 1/27* (2022.01); *H04N 23/51* (2023.01); *H04N 23/55* (2023.01); *H04N 23/57* (2023.01);
(Continued)

(58) Field of Classification Search
CPC ................ B60R 1/27; B60R 2300/105; B60R 2300/408; H04N 23/51; H04N 23/55; H04N 23/57; H04N 23/665; H04N 25/40
See application file for complete search history.

(56) References Cited

U.S. PATENT DOCUMENTS 7,619,680 B1 * 11/2009 Bingle .................... H04N 23/55
348/361
11,161,456 B1 * 11/2021 Day .......................... B60R 1/26
(Continued)

FOREIGN PATENT DOCUMENTS

JP 2009246917 A 10/2009
JP 2013207622 A 10/2013
(Continued)

OTHER PUBLICATIONS

Notice of Reasons for Refusal, dated Jan. 7, 2025, for Japanese Patent Application No. 2023-006337. (6 pages) (With English Machine Translation).
(Continued)

*Primary Examiner* — Timothy R Newlin
(74) *Attorney, Agent, or Firm* — Seed Intellectual Property Law Group LLP

(57) ABSTRACT

A vehicular camera includes: an imaging sensor including a first pixel region having X1 pixels arranged in a first direction and Y1 pixels arranged in a second direction intersecting the first direction; an optical system including at least one lens and having an optical axis intersecting the first pixel region; and a memory configured to store a position of a second pixel region inside the first pixel region and having X2 pixels arranged in the first direction and Y2 pixels arranged in the second direction, the X2 being smaller than the X1, the Y2 being smaller than the Y1. The vehicular camera is configured to: read the position of the second pixel region from the memory in response to start-up of the imaging sensor; and output an output image corresponding to the second pixel region while outputting the position of the second pixel region.

10 Claims, 15 Drawing Sheets

(51) Int. Cl.
*H04N 23/55* (2023.01)
*H04N 23/57* (2023.01)
*H04N 23/60* (2023.01)
*H04N 25/40* (2023.01)

(52) U.S. Cl.
CPC ......... H04N 23/665 (2023.01); H04N 25/40 (2023.01); *B60R 2300/105* (2013.01); *B60R 2300/408* (2013.01)

(56) References Cited

U.S. PATENT DOCUMENTS

| | | | |
|---|---|---|---|
| 11,611,699 B2* | 3/2023 | Adsumilli | H04N 23/90 |
| 2002/0047901 A1* | 4/2002 | Nobori | G06T 7/97 |
| | | | 382/104 |
| 2004/0150727 A1* | 8/2004 | Battles | H04N 5/772 |
| | | | 386/E5.072 |
| 2007/0188622 A1* | 8/2007 | Yagi | H04N 23/667 |
| | | | 348/E5.042 |
| 2009/0251554 A1* | 10/2009 | Kido | H04N 25/443 |
| | | | 348/222.1 |
| 2010/0281360 A1* | 11/2010 | Arakane | H04N 1/00429 |
| | | | 715/810 |
| 2013/0113985 A1* | 5/2013 | Ikeda | H04N 23/67 |
| | | | 348/347 |
| 2013/0250114 A1* | 9/2013 | Lu | H04N 5/2621 |
| | | | 348/148 |
| 2015/0220793 A1* | 8/2015 | Kiyohara | G06V 20/58 |
| | | | 382/103 |
| 2016/0133051 A1* | 5/2016 | Aonuma | G06T 19/006 |
| | | | 345/633 |
| 2017/0085846 A1* | 3/2017 | Damberg | H04N 9/3167 |
| 2017/0217370 A1* | 8/2017 | Yatsuri | G06T 7/70 |
| 2017/0309002 A1* | 10/2017 | Koyano | G06T 5/80 |
| 2017/0310952 A1* | 10/2017 | Adomat | H04N 23/73 |
| 2018/0048801 A1* | 2/2018 | Kiser | G06V 20/582 |
| 2018/0332219 A1* | 11/2018 | Corcoran | H04N 23/635 |
| 2019/0124275 A1* | 4/2019 | Murad | H04N 23/56 |
| 2019/0356850 A1* | 11/2019 | Ashrafi | H04N 23/667 |
| 2020/0039448 A1 | 2/2020 | Lu et al. | |
| 2020/0074594 A1 | 3/2020 | Taniguchi | |
| 2020/0174130 A1* | 6/2020 | Banerjee | B60R 11/04 |
| 2021/0056727 A1 | 2/2021 | Iwano et al. | |
| 2022/0148320 A1* | 5/2022 | Alakarhu | G08G 1/0175 |
| 2023/0181002 A1* | 6/2023 | Duckett, III | A61B 1/0676 |
| | | | 600/408 |
| 2023/0395237 A1* | 12/2023 | Bao | G16H 30/20 |
| 2023/0412575 A1 | 12/2023 | Miyamoto et al. | |

FOREIGN PATENT DOCUMENTS

| | | |
|---|---|---|
| JP | 2016005234 A | 1/2016 |
| JP | 2017195516 A | 10/2017 |
| JP | 2019176340 A | 10/2019 |
| JP | 2020036166 A | 3/2020 |
| JP | 2020106598 A | 7/2020 |
| WO | 2020189182 A1 | 9/2020 |
| WO | 2021199351 A1 | 10/2021 |
| WO | 2022075081 A1 | 4/2022 |

OTHER PUBLICATIONS

Notice of Reasons for Refusal, dated Apr. 15, 2025, for Japanese Patent Application No. 2023-050761. (7 pages) (with English Translation).

* cited by examiner

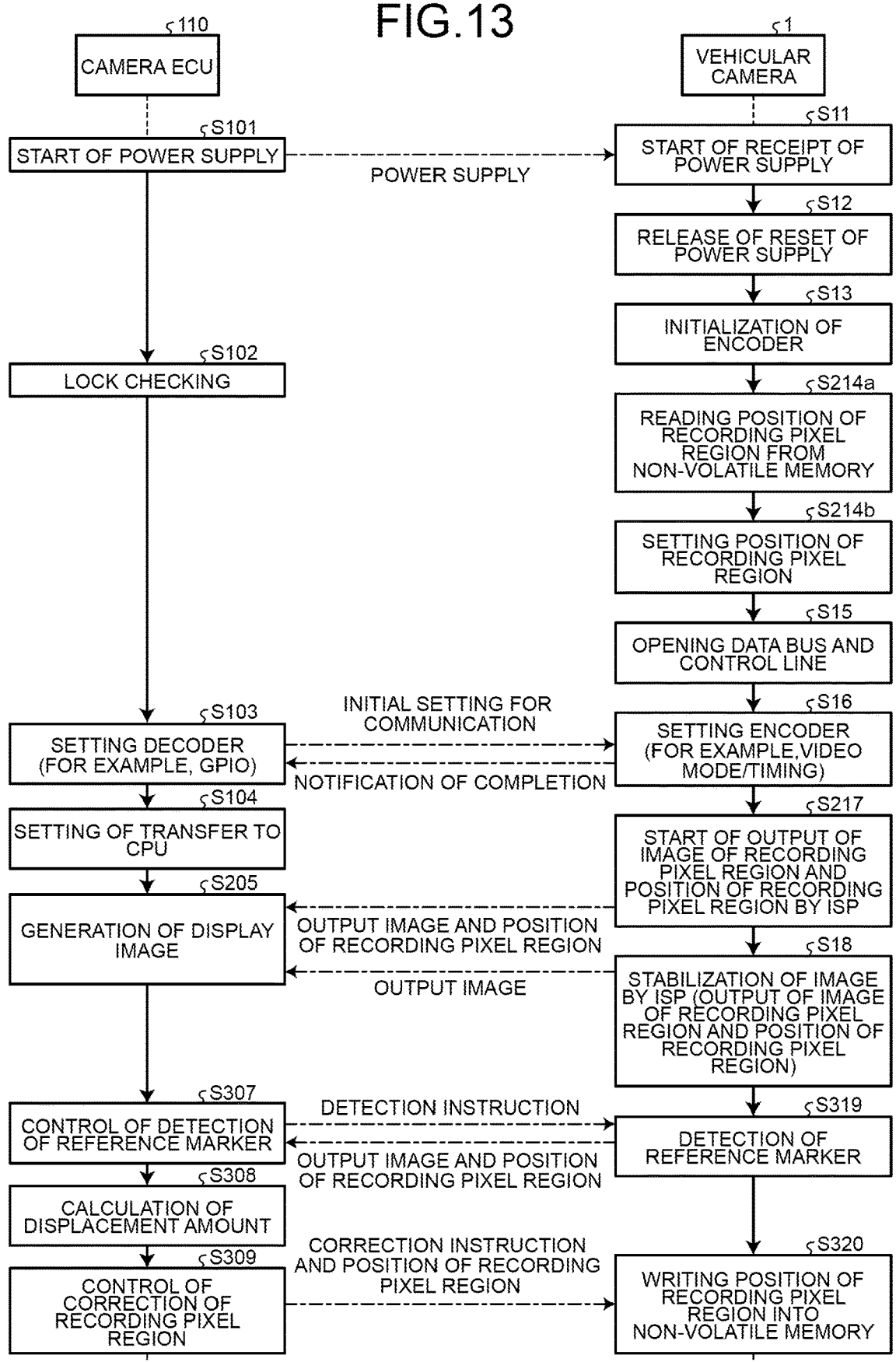

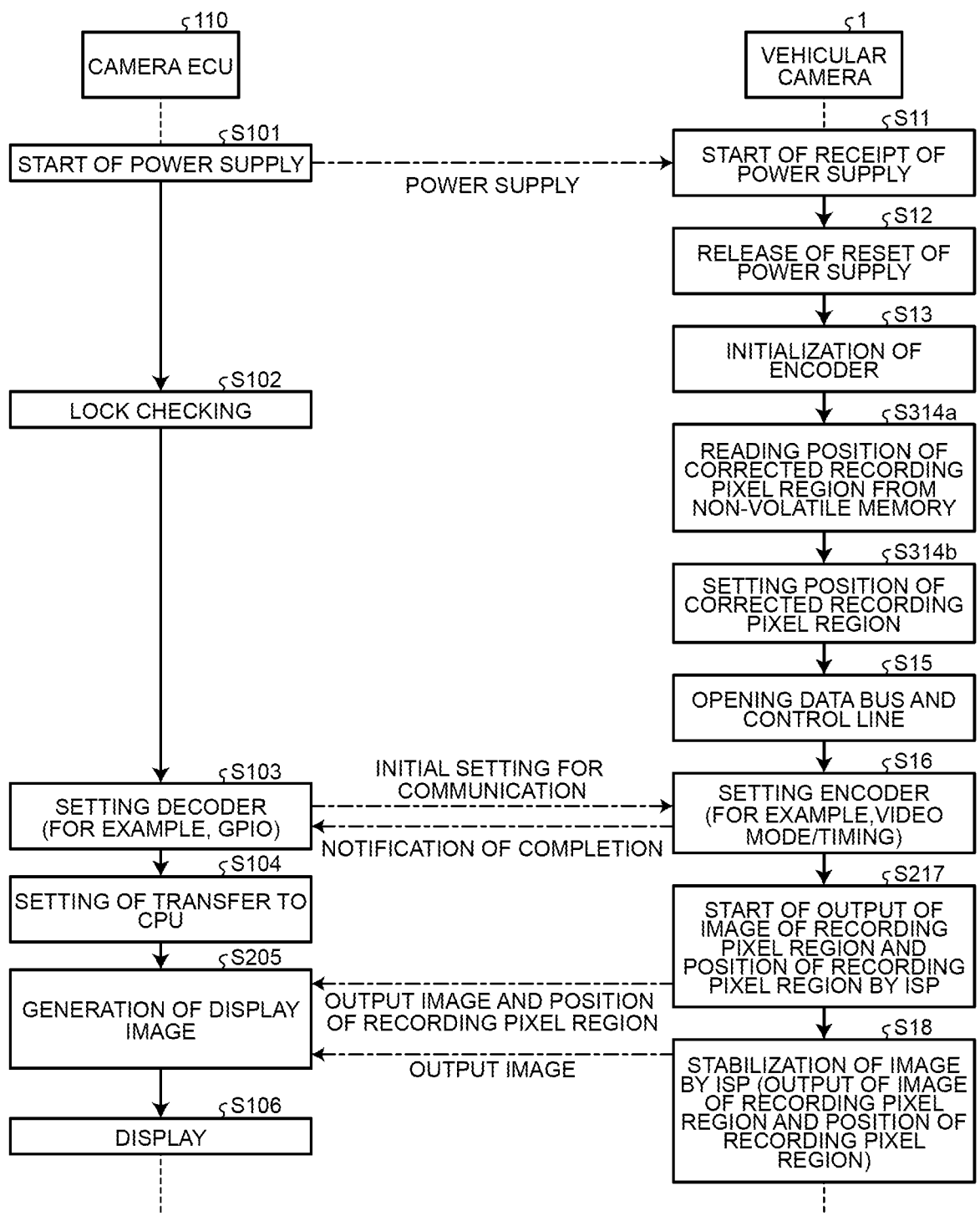

VEHICULAR CAMERA

CROSS-REFERENCE TO RELATED APPLICATIONS

This application is based upon and claims the benefit of priority from Japanese Patent Application No. 2023-006337, filed on Jan. 19, 2023 and Japanese Patent Application No. 2023-050761, filed on Mar. 28, 2023, the entire contents of which are incorporated herein by reference.

FIELD

Embodiments described herein relate to a vehicular camera.

BACKGROUND

When a vehicular camera connected to a vehicle acquires an image of the surroundings of a vehicle, the vehicular camera transfers the image to the vehicle. It is desirable for the vehicular camera to efficiently transfer the image to the vehicle.

A vehicular camera according to the present disclosure includes an imaging sensor, an optical system, and a memory. The imaging sensor includes a first pixel region. In the first pixel region, X1 pixels are arranged along a first direction and Y1 pixels are arranged along a second direction. The second direction intersects the first direction. The first pixel region is a region in the shape of a first quadrangle. The optical system includes at least one lens. The optical system has an optical axis. The optical axis intersects the first pixel region of the imaging sensor. The memory stores a position of the second pixel region. The second pixel region is a region inside the first pixel region. In the second pixel region, X2 pixels are arranged along the first direction and Y2 pixels are arranged along the second direction. X2 is smaller than X1. Y2 is smaller than Y1. The second pixel region is a region in the shape of a second quadrangle. The vehicular camera reads the position of the second pixel region from the memory in response to the start-up of the imaging sensor. The vehicular camera outputs an output image corresponding to the second pixel region inside the first pixel region of the imaging sensor and also outputs the position of the second pixel region.

SUMMARY

A vehicular camera according to the present disclosure includes an imaging sensor, an optical system, and a memory. The imaging sensor includes a first pixel region in a shape of a first quadrangle. The first pixel region has X1 pixels arranged in A first direction and Y1 pixels arranged in a second direction intersecting the first direction. The optical system includes at least one lens and having an optical axis intersecting the first pixel region of the imaging sensor. The memory is configured to store a position of a second pixel region in a shape of a second quadrangle, the second pixel region being inside the first pixel region and having X2 pixels arranged in the first direction and Y2 pixels arranged in the second direction. The X2 is smaller than the X1. The Y2 is smaller than the Y1. The vehicular camera is configured to read the position of the second pixel region from the memory in response to start-up of the imaging sensor. The vehicular camera is configured to output an output image corresponding to the second pixel region from inside the first pixel region of the imaging sensor, while outputting the position of the second pixel region.

BRIEF DESCRIPTION OF THE DRAWINGS

FIG. 13 is a flowchart illustrating the calibration of a vehicular camera according to a third embodiment;

FIG. 16 is a flowchart illustrating an operation of the vehicular camera according to the third embodiment.

DETAILED DESCRIPTION

Hereinafter, embodiments of a vehicular camera according to the present disclosure will be described with reference to the drawings.

First Embodiment

A vehicular camera according to a first embodiment is connected to a vehicle, acquires an image of the surroundings of the vehicle 100, and transfers the image to the vehicle. The vehicular is designed so as to efficiently transfer the image to the vehicle.

Figure 1:
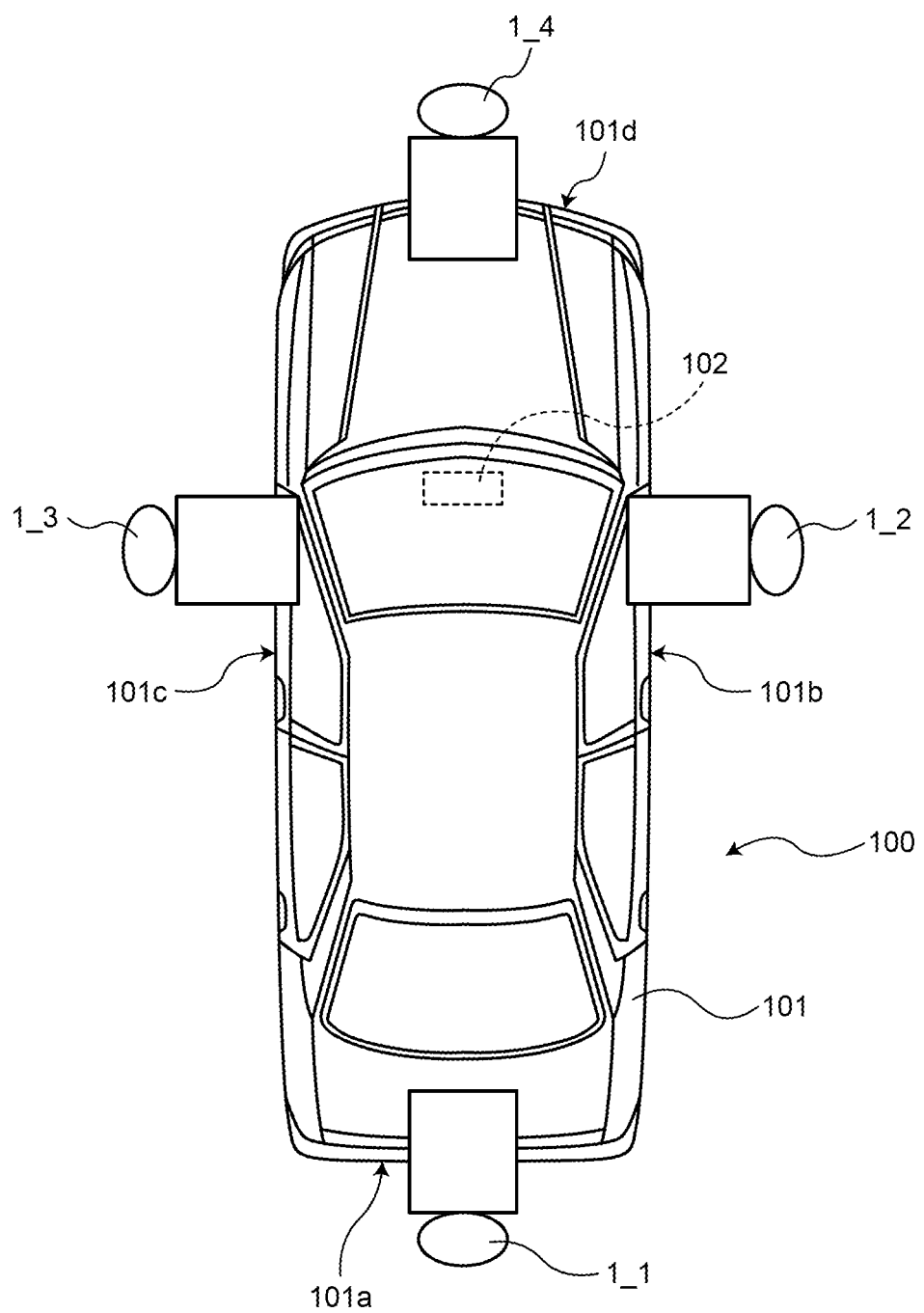
FIG. 1 is a top view of a vehicle equipped with a vehicular camera according to a first embodiment.

The vehicular camera 1 can be mounted on the vehicle 100 illustrated in FIG. 1. FIG. 1 is a top view of the vehicle 100 equipped with the vehicular camera 1. The vehicular camera 1 is disposed on the outside of a vehicle body 101 and is capable of acquiring an image around the vehicle. The vehicle 100 is capable of processing the image of the surroundings of the vehicle, the image being acquired by the vehicular camera 1, and outputting the processed image to a predetermined display.

In FIG. 1, a configuration is illustrated in which a plurality of vehicular cameras 1_1, 1_2, 1_3, 1_4 is disposed at a rear end 101a, a side end (on the right side in FIG. 1) 101b, a side end (on the left side in FIG. 1) 101c, and a front end 101d of the vehicle body 101, respectively. An image acquired by each of vehicular cameras 1_1, 1-2, 1_3, 1_4 can be displayed on a display 102.

In FIG. 1, the four vehicular cameras 1_1 to 1_4 are illustrated, but the number of the vehicular cameras 1 may be three or fewer, or may be five or more. The vehicular camera 1 may be disposed at any other location in the vehicle body 101 as long as an image of the surroundings of the vehicle can be acquired. Alternatively, the vehicular camera 1 may be disposed at any other location as long as an image of a vehicle interior of the vehicle body 101 can be acquired. An image may be output to an output device other than the display 102.

Figure 2:
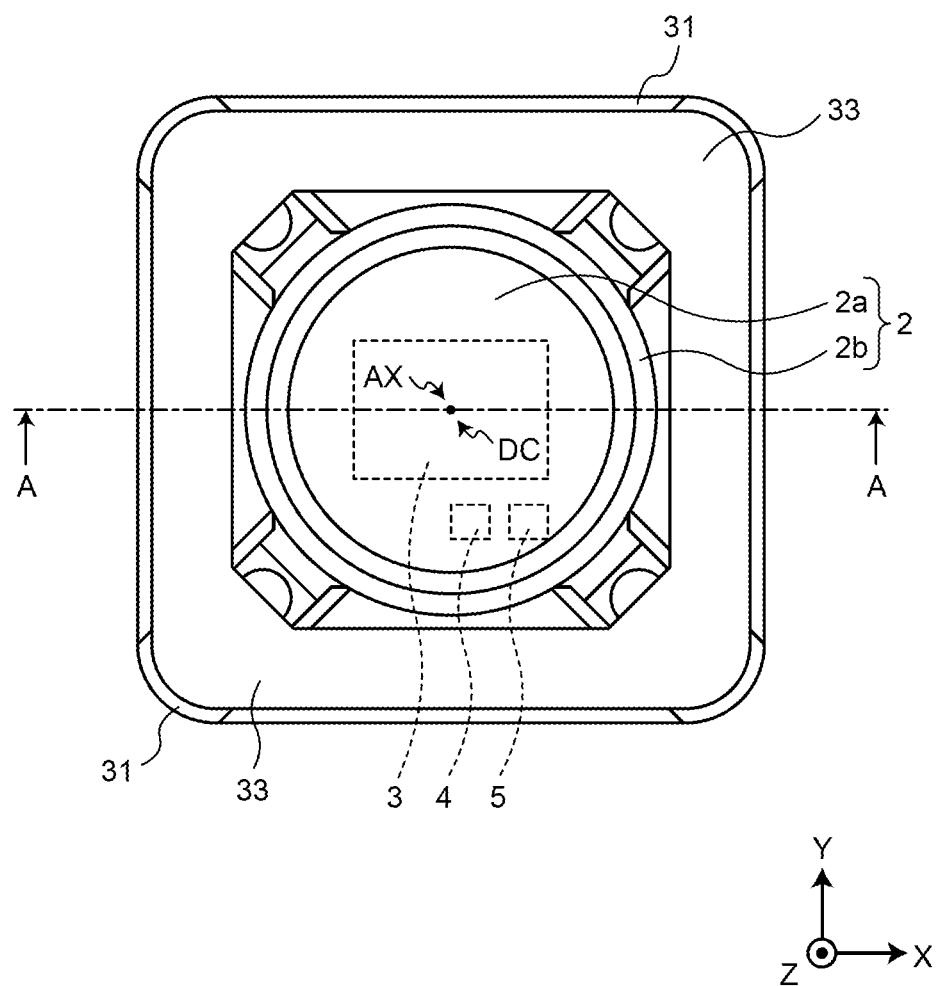
FIG. 2 is a front view of the vehicular camera according to the first embodiment.
Figure 3:
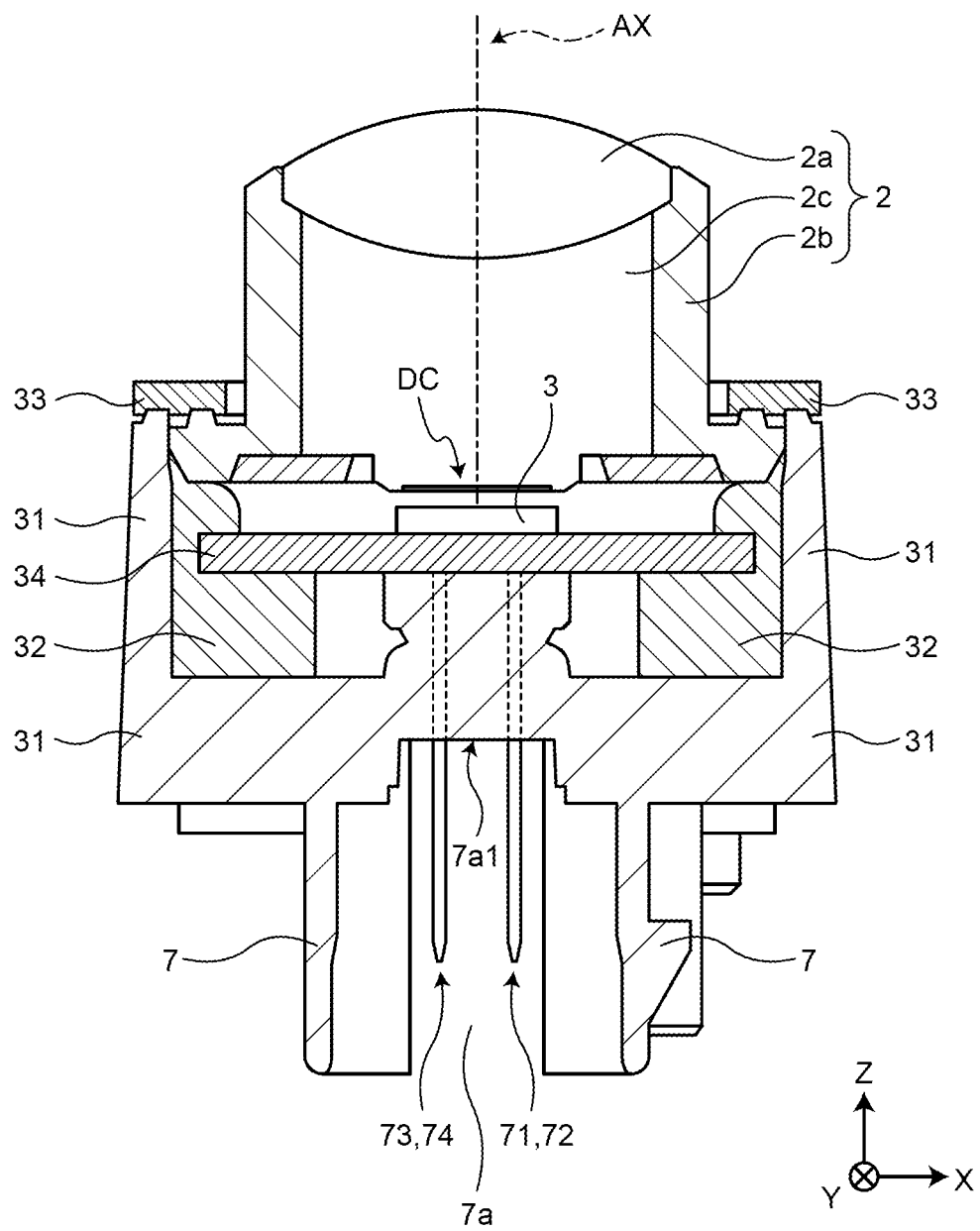
FIG. 3 is a cross-sectional view illustrating a configuration of the vehicular camera according to the first embodiment.

As illustrated in FIG. 2 and FIG. 3, the vehicular camera 1 has a configuration suitable to be mounted on the vehicle 100. FIG. 2 is a plan view illustrating the configuration of the vehicular camera 1. FIG. 3 is a cross-sectional view illustrating the configuration of the vehicular camera. FIG. 3 is the cross-sectional view taken along line A-A in FIG. 2. Hereinafter, an optical axis direction of the vehicular camera 1 is taken as a Z direction, and two directions orthogonal to each other in a plane perpendicular to the Z direction are an X direction and a Y direction.

The vehicular camera 1 includes an optical system 2, a housing 31, an imaging sensor 3, an image signal processor (ISP) 4, a non-volatile memory 5, a circuit board 34, a connector 7, a potting member 32, and a weld ring 33.

The optical system 2 includes a lens 2a and a lens barrel 2b. The lens 2a is disposed on the upstream side (the +Z side) of an optical axis AX in the vehicular camera 1. The lens 2a is capable of forming an image of a subject on an imaging surface of the lens 2a. The lens 2a can have distortion. The lens 2a is formed of a translucent material such as glass. In FIG. 1, the optical system 2 includes one lens 2a, but the optical system 2 may have a plurality of lenses 2a.

The lens barrel 2b holds the lens 2a from the outside in the X and Y directions. The lens barrel 2b includes a cavity 2c thereinside in the X and Y directions, the cavity 2c allowing the optical axis AX to pass therethrough and guides light from the lens 2a to the downstream side (the −Z side) along the optical axis AX. The lens barrel 2b can be formed of a light-shielding material.

The housing 31 is a box-shaped member being open on the +Z-side. The housing 31 can be formed of a light-shielding material. The housing 31 is disposed on the −Z side of the optical system 2. The housing 31 houses the imaging sensor 3, the ISP 4, the non-volatile memory 5, and the circuit board 34.

The −Z-side end of the lens barrel 2b is connected to the weld ring 33. An outer portion in the X and Y directions of the lens barrel 2b is covered with the weld ring 33 at the +Z-side end of the housing 31.

The circuit board 34 is fixed to the housing 31 by screwing or the like. At least the imaging sensor 3 is mounted on the circuit board 34. Furthermore, the ISP 4 and the non-volatile memory 5 can be mounted on the circuit board 34. The imaging sensor 3, the ISP 4, and the non-volatile memory 5 can be mounted on separate chips, and each of the chips can be mounted on a main surface on the +Z side of the circuit board 34. The potting member 32 may be interposed between the circuit board 34 and the housing 31. The potting member 32 can be formed of a waterproof material.

Note that the imaging sensor 3, the ISP 4, and the non-volatile memory 5 may be mounted on one chip or mounted on separate chips. The imaging sensor 3 and the ISP 4 may be mounted on one chip, and the non-volatile memory 5 may be mounted on another chip.

The imaging sensor 3, the ISP 4, and the non-volatile memory 5 may be mounted on different circuit boards. For example, the vehicular camera 1 may further include another circuit board 35 (not illustrated), in which the imaging sensor 3 and the ISP 4 may be mounted as one chip or separate chips on the same circuit board 34, while the non-volatile memory 5 may be mounted on the other circuit board 35. Alternatively, the imaging sensor 3 may be mounted as one chip on the circuit board 34, and the ISP 4 and the non-volatile memory 5 may be mounted as one chip or separate chips on the other circuit board 35.

The imaging sensor 3 is disposed in the vicinity of an imaging face of the lens 2a. The imaging sensor 3 may be a complementary metal oxide semiconductor (CMOS) imaging sensor or a charge coupled device (CCD) imaging sensor, for example.

The ISP 4 is capable of applying predetermined processing to a signal output from the imaging sensor 3. In the ISP 4, the predetermined processing may be implemented in a hardware manner or in a software manner, or alternatively a part of the processing may be implemented in a hardware manner and the rest may be implemented in a software manner. The ISP 4 may be disposed in the vicinity of the imaging sensor 3.

The non-volatile memory 5 is capable of storing information received from the ISP 4, in the non-volatile manner. The non-volatile memory 5 may be disposed in the vicinity of the ISP 4. The non-volatile memory 5 may be, for example, a flash memory, a resistive random access memory (ReRAM), a ferroelectric random access memory (FeRAM), or a magnetoresistive random access memory (MRAM).

The housing 31 is connected to the vehicle body 101 via a fixing member (not illustrated). The fixing member is, for example, a bracket. Thus, the vehicular camera 1 is mounted on the vehicle body 101.

Figure 4:
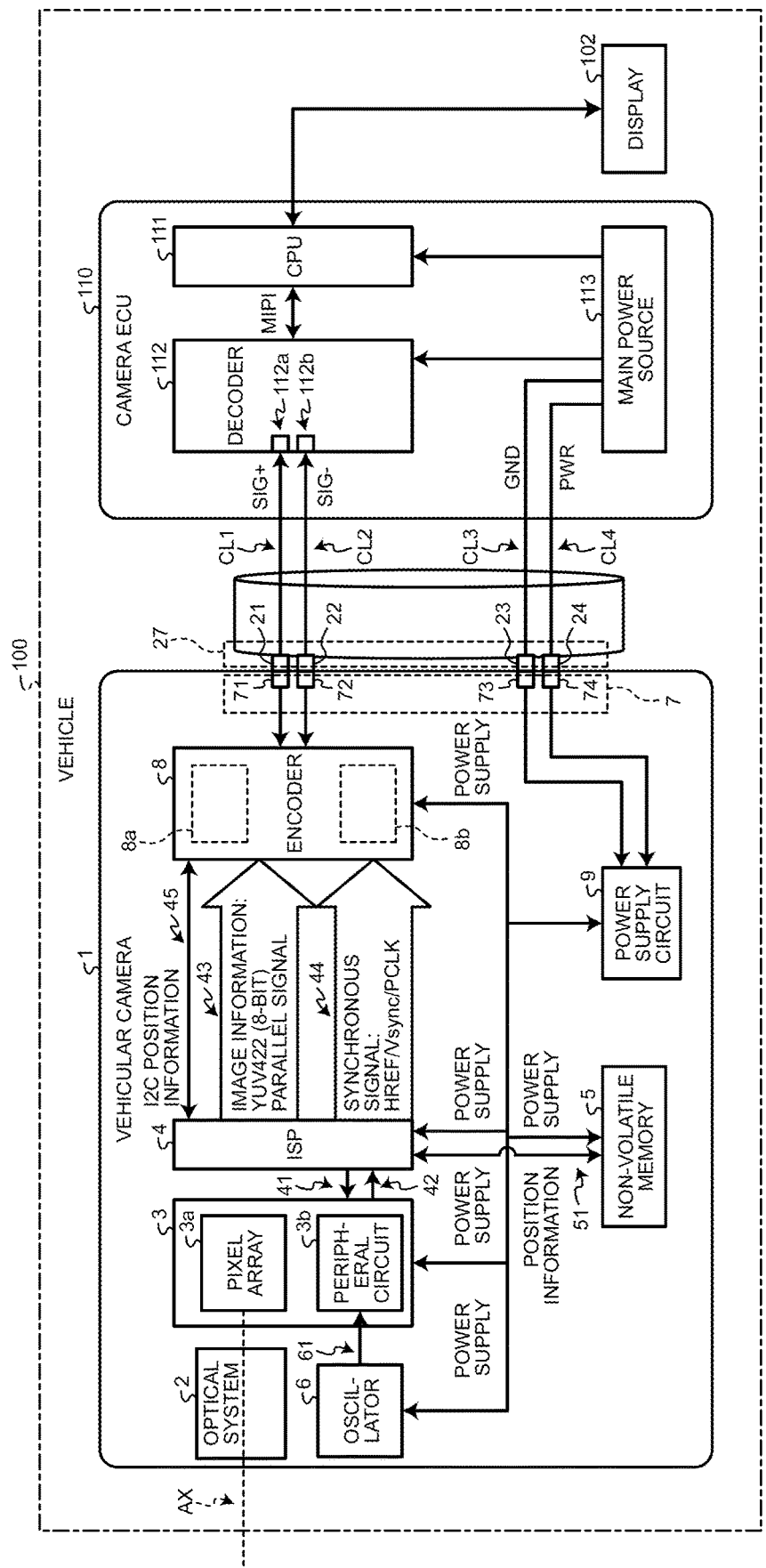
FIG. 4 is a block diagram illustrating the configuration of the vehicular camera according to the first embodiment.

As illustrated in FIG. 4, the connector 7 functions as a connector for electrically connecting the vehicular camera 1 to a camera electronic control unit (ECU) 100 via a cable 20 (see FIG. 4). FIG. 4 is a block diagram illustrating the configuration of the vehicular camera 1.

Note that, in the present specification, an expression of "a first element and a second element are "electrically connected to each other" shall include a connection between the first element and the second element with the intervention of a third element to the extent that the intervention does not hinder functions of the first element and the second element.

The camera ECU 100 may be disposed inside the vehicle body 101 of the vehicle 100. A connector 27 at one end of the cable 20 can be connected to the connector 7 and a connector at another end of the cable 20 can be connected to a constituent of the vehicle 100 (for example, a connector for connecting to the camera ECU 100). In FIG. 4, the connector at the other end of the cable 20 is not illustrated for simplicity.

The cable 20 can mediate serial communications between the vehicular camera 1 and the camera ECU 100. The cable 20 may transmit a single-ended signal or a differential signal between the vehicular camera 1 and the camera ECU 100.

In the cable 20, a high-frequency component of a loss of signal strength in a transmission signal tends to be larger than a low-frequency component thereof, due to a channel loss caused by the skin effect of wire, a dielectric loss, or the like. Therefore, in the cable 20, a bandwidth allowing signal transmission may be limited to an upper-limit frequency Fth or lower. The upper-limit frequency Fth may be 148.5 MHz. When signals are transmitted via the cable 20 at the upper-limit frequency Fth or lower, a signal quality in serial communications can be guaranteed.

In the case of transmitting a single-ended signal, the cable 20 may be a coaxial cable. Accordingly, the connector 7 of the vehicular camera 1 and the connector 27 of the cable 20 may be coaxial connectors.

In the case of transmitting a differential signal, the cable 20 may be a twist-pair cable. The cable 20 may be a twist-pair cable conforming to the Car Camera Bus (C2B) (registered trademark) standard. Accordingly, the connector 7 of the vehicular camera 1 and the connector 27 of the cable 20 may be connectors for twist-pair cables. In FIG. 3 and FIG. 4, a configuration with which the cable 20 transmits a differential signal is illustrated.

The connector 7 illustrated in FIG. 3 includes a cavity 7a. The connector 7 includes a plurality of connection terminals 71, 72, 73, 74 in the cavity 7a. Each of the connection terminals 71, 72, 73, 74 may be a protruding connection terminal. Each of the connection terminals 71, 72, 73, 74 protrudes from a bottom face 7a1 of the cavity 7a toward the ~Z side.

The cavity 7a of the connector 7 may allow the connector 27 of the cable 20 illustrated in FIG. 4 to be inserted into the cavity 7a. The connector 27 includes a plurality of connection terminals 21 to 24. The connection terminals 21, 22, 23, 24 of the connector 27 correspond to the connection terminals 71, 72, 73, 74 of the connector 7, respectively. Each of the connection terminals 21 to 24 may be a recessed connection terminal configured to be engageable with a corresponding connection terminal (for example, the protruding connection terminal illustrated in FIG. 3).

The cable 20 includes a plurality of communication lines CL1 to CL4 corresponding to the connection terminals 21, 22, 23, 24, respectively. The camera ECU 110 includes a central processing unit (CPU) 111, a decoder 112, and a main power source 113. The communication lines CL1, CL2 connect the vehicular camera 1 to the decoder 112 and transmit differential signals SIG+, SIG− between the vehicular camera 1 and the decoder 112, respectively. The communication lines CL3, CL4 connect the vehicular camera 1 to the main power source 113 and transmit a ground potential GND and a power supply potential PWR, respectively, from the main power source 113 to the vehicular camera 1.

In addition to the optical system 2, the imaging sensor 3, the ISP 4, the non-volatile memory 5, and the connector 7, the vehicular camera 1 further includes an oscillator 6, an encoder 8, and a power supply circuit 9. The imaging sensor 3 includes a pixel array 3a and a peripheral circuit 3b. The encoder 8 includes an input circuit 8a and an output circuit 8b.

Note that the oscillator 6, the encoder 8, and the power supply circuit 9 may be mounted on the same circuit board 34 (see FIG. 3) on which the imaging sensor 3 is mounted, or may be mounted on the other circuit board 35 (not illustrated).

The connector 7 includes the connection terminals 71 to 74. Of the connection terminals 71 to 74, the connection terminals 71, 72 constitute a differential pair and serve as terminals for differential signals of opposite phases. The connection terminals 71, 72 are each electrically connected to the ISP 4 via the encoder 8. The connection terminal 73 functions as a ground terminal and the connection terminal 74 functions as a power supply terminal. The connection terminals 73, 74 are each electrically connected to the power supply circuit 9.

The power supply circuit 9 receives the ground potential GND and the power supply potential PWR via the connection terminals 73, 74 of the connector 7. The power supply circuit 9 is connected to the oscillator 6, the imaging sensor 3, the ISP 4, the non-volatile memory 5, and the encoder 8 via power supply lines. The power supply circuit 9 is capable of supplying power to the oscillator 6, the imaging sensor 3, the ISP 4, the non-volatile memory 5, and the encoder 8 via the power lines.

The optical axis AX of the optical system 2 intersects the pixel array 3a of the imaging sensor 3.

Figure 5:
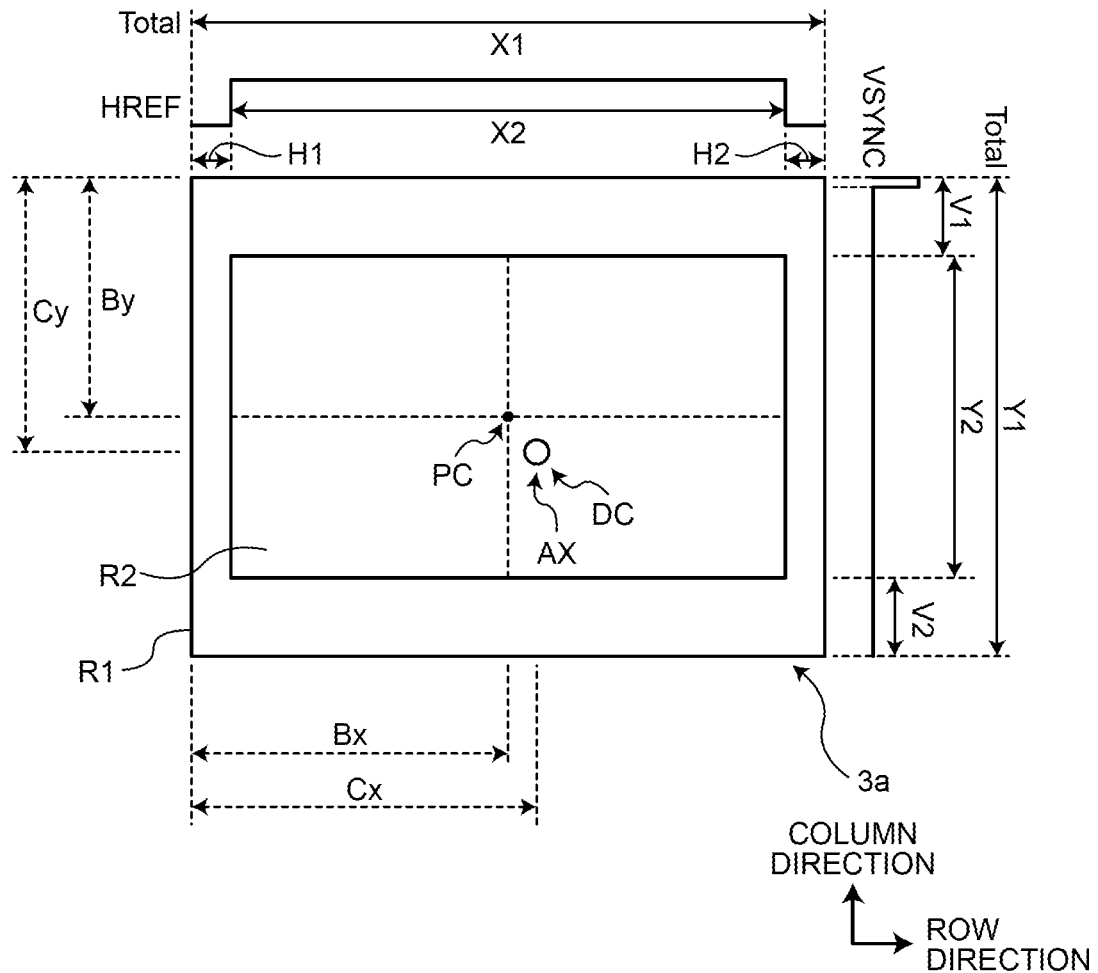
FIG. 5 is a diagram illustrating an effective pixel region and a recording pixel region of a pixel array according to the first embodiment.

In the pixel array 3a of the imaging sensor 3, a plurality of pixels are arranged to form a plurality of rows and a plurality of columns, as illustrated in FIG. 5. FIG. 5 is a diagram illustrating an effective pixel region R1 and a recording pixel region R2 of the pixel array 3a. A direction along the rows is referred to as the row direction, and a direction along the columns is referred to as the column direction. The row direction and the column direction may be orthogonal to each other or intersect at a predetermined angle (for example, from 89° to 91°). The row direction is also referred to as the horizontal direction. The column direction is also referred to as the vertical direction.

In FIG. 5, the pixel array 3a in which pixels are arranged in $Y_1$ rows×$X_1$ columns is illustrated. A region corresponding to the entirety of the pixel array 3a is referred to as the effective pixel region R1. In the effective pixel region R1, $X_1$ pixels are arranged in the row direction and $Y_1$ pixels are arranged in the column direction. Each of $X_1$ and $Y_1$ is a natural number. The effective pixel region R1 is in the shape of a first quadrangle. The first quadrangle may be a first rectangle in which the row direction is the longitudinal direction. In this case, for example, $X_1$ may be 1572 and $Y_1$ may be 1016.

The peripheral circuit 3b illustrated in FIG. 4 is connected to the oscillator 6 via a control line 61 and can receive a timing signal via the control line 61.

The ISP 4 is connected to the peripheral circuit 3b via a control line 41 and connected to the encoder 8 via a control line 44. The control line 44 may support the Inter-Integrated Circuit (I2C) protocol. The ISP 4 and the encoder 8 both may establish communication with a connection destination via the control line 44 in accordance with the I2C protocol. The ISP 4 generates synchronous signals and control signals and supplies these signals to the peripheral circuit 3b via the control line 41 and to the encoder 8 via the control line 44 in accordance with the I2C protocol. The synchronous signals include a horizontal synchronous signal HREF, a vertical synchronous signal Vsync, and a pixel clock PCLK. The control signals include the number of vertical blanking pixels $V_1$, $V_2$.

Here, for example, the vehicular camera 1 is required that acquires a moving image and transfers the moving image to the vehicle 100 side (the camera ECU 110 side) via the cable 20, while satisfying a predetermined frame rate in accordance with a specification of the vehicle 100. As described above, in the cable 20, a bandwidth allowing signal transmission may be limited to the upper-limit frequency Fth or lower. For example, when an image of the effective pixel region R1 is transmitted to the vehicle 100 side via the cable 20 at a speed equal to or lower than the upper-limit frequency Fth, the data volume of the image tends to be too large to satisfy the predetermined frame rate.

Therefore, the ISP 4 can control the peripheral circuit 3b to output a signal of an output image corresponding to the recording pixel region R2 in the effective pixel region R1. The recording pixel region R2 is a region inside the effective pixel region R1 and is a part of the effective pixel region R1. The peripheral circuit 3b can drive the pixel array 3a to selectively output a pixel signal from the recording pixel region R2 in accordance with a timing signal from the oscillator 6 and synchronization signals (a horizontal synchronous signal HREF, a vertical synchronous signal Vsync, and a pixel clock PCLK) and control signals (the number of vertical blanking pixels $V_1$, $V_2$) from the ISP 4.

For example, the recording pixel region R2 illustrated in FIG. 5 can be defined in accordance with the horizontal synchronous signal HREF, the vertical synchronous signal Vsync, the number of vertical blanking pixels $V_1$, $V_2$, and the like.

The recording pixel region R2 is a region inside the effective pixel region R1 in the pixel array 3a. In the recording pixel region R2, $X_2$ pixels are arranged in the row direction and $Y_2$ pixels are arranged in the column direction. Each of $X_2$ and $Y_2$ is a natural number. Each of $X_2$ and $Y_2$ can be experimentally determined in advance in accordance with the upper-limit frequency Fth at which signals can be transmitted by the cable 20.

The peripheral circuit 3b performs reading-scanning for, while sequentially selecting a plurality of pixel rows in accordance with the horizontal synchronous signal HREF, the vertical synchronous signal Vsync, the pixel clock PCLK, and the number of vertical blanking pixels $V_1$, $V_2$, reading a pixel signal from each of the column pixels included in the selected pixel rows.

For example, the peripheral circuit 3b starts the reading scanning from the first row in accordance with a rising edge of the vertical synchronous signal Vsync. The peripheral circuit 3b counts the location of a selected image row. The peripheral circuit 3b skips the first row to the $V_1$th row in accordance with the number of vertical blanking pixels $V_1$. The peripheral circuit 3b sequentially selects pixels in the ($V_1$+1)th row from left to right in FIG. 5 in accordance with the pixel clock PCLK, and, when the horizontal synchronous signal HREF shifts from an inactive level (for example, L level) to an active level (for example, H level), the peripheral circuit 3b starts to output pixel signals of the selected pixels to a signal line 42. The peripheral circuit 3b starts to output pixel signals to the signal line 42, beginning with a pixel in the ($H_1$+1)th column in the ($V_1$+1)th row. Furthermore, the peripheral circuit 3b sequentially selects pixels in the ($V_1$+1)th row in accordance with the pixel clock PCLK, and stops outputting the pixel signals to the signal line 42 when the horizontal synchronous signal HREF sifts from the active level to the inactive level. The peripheral circuit 3b outputs pixel signals of pixels in the ($H_1$+1)th to the ($H_1$+$X_2$)th columns in the ($V_1$+1)th row to the signal line 42, and stops outputting the pixel signals from pixels in the ($H_1$+$X_2$+1)th column and subsequent ones to the signal line 42. When the peripheral circuit 3b selects the pixels in the ($V_1$+1)th row from left to the right end in accordance with the pixel clock PCLK, the peripheral circuit 3b performs count-up of the ($V_1$+2)th row and starts to select pixels in the ($V_1$+2)th row from the left in accordance with the pixel clock PCLK. Hereinafter, the same operation is repeated until the ($V_1$+$Y_2$)th row. When the peripheral circuit 3b selects pixels in the ($V_1$+$Y_2$)th row from left to the right end in accordance with the pixel clock PCLK, the peripheral circuit 3b performs count-up of the ($V_1$+$Y_2$+1)th row and skips from the ($V_1$+$Y_2$+1)th to $Y_1$th rows in accordance with the number of vertical blanking pixels $V_2$ (=$Y_1$−($V_1$+$V_2$)), the peripheral circuit 3b completes the reading scanning.

$X_2$ is smaller than $X_1$, and the following Formula 1 holds.

$$X_1 = H_1 + X_2 + H_2 \quad \text{Formula 1}$$

In Formula 1, $H_1$ is the number of horizontal blanking pixels on the left side of the recording pixel region R2 in FIG. 5. He is the number of horizontal blanking pixels on the right side of the recording pixel region R2 in FIG. 5. The number of horizontal blanking pixels $H_1$ corresponds to the number of pixel clocks in a horizontal blanking period in which the horizontal synchronous signal HREF is maintained at the L level before reaching the H level. The number of horizontal blanking pixels $H_2$ corresponds to the number of pixel clocks in the horizontal blanking period in which the horizontal synchronous signal HREF is maintained at the L level after reaching the L level from the H level.

$Y_2$ is smaller than $Y_1$, and the following Formula 2 holds.

$$Y_1 = V_1 + Y_2 + V_2 \quad \text{Formula 2}$$

In Formula 2, $V_1$ is the number of vertical blanking pixels on the upper side of the recording pixel region R2 in FIG. 5. $V_2$ is the number of vertical blanking pixels on the lower side of the recording pixel region R2 in FIG. 5.

The number of vertical blanking pixels $V_1$ corresponds to the number of vertical blanking rows in which reading of pixel signals is skipped from a rising edge timing of the vertical synchronous signal Vsync. The number of vertical blanking pixels $V_2$ corresponds to the number of vertical blanking rows in which reading a pixel signal is skipped after the completion of reading of a pixel signal in the ($V_1$+$Y_2$)th row.

The recording pixel region R2 is in the shape of a second quadrangle. The second quadrangle may be a second rectangle. In this case, for example, $X_2$ may be 1280 and $Y_2$ may be 960.

The position of the recording pixel region R2 in the effective pixel region R1 can be set so that the center PC of the recording pixel region R2 is approximately in agreement with the center of the effective pixel region R1. In this case, the following Formula 3 holds.

$$H_1 = H_2, V_1 = V_2 \quad \text{Formula 3}$$

The position in the effective pixel region R1 can be expressed in pixel coordinates. The pixel coordinates are expressed in (row number, column number). The position of a pixel at the upper left corner of the effective pixel region R1 in FIG. 5 is taken as the origin (1,1) of the pixel coordinates.

The pixel coordinates (Bx, By) of the center PC of the recording pixel region R2 can be set to be approximately in agreement with the center of the effective pixel region R1 and satisfy the following Formula 4.

$$Bx = X_1/2, By = Y_1/2 \quad \text{Formula 4}$$

On the other hand, the optical axis AX of the optical system 2 intersects the effective pixel region R1 at a position displaced from the center of the effective pixel region R1 and intersects the recording pixel region R2 at a position displaced from the center PC of the recording pixel region R2. As described above, the lens 2a of the optical system 2 has distortion and can form a subject image with barrel or pin-cushion distortion in the effective pixel region R1. The distortion center DC of the subject image is displaced from the center of the effective pixel region R1 and displaced from the center PC of the recording pixel region R2.

The position of the distortion center DC is stored in the non-volatile memory 5 in a non-volatile manner. The position of the distortion center DC is expressed by the pixel coordinates (Cx, Cy) of the distortion center DC. The pixel coordinates (Cx, Cy) of the distortion center DC satisfy the following Formula 5.

$$Cx \neq Bx, Cy \neq By \quad \text{Formula 5}$$

The pixel array 3a illustrated in FIG. 4 is connected to the ISP 4 via the signal line 42.

The ISP 4 can receive a plurality of pixel signals output from the recording pixel region R2 in the pixel array 3a via the signal line 42. The ISP 4 applies predetermined processing to the pixel signals to generate image information of the recording pixel region R2. The image information can include a signal of any color system, for example, an YUV signal. The YUV signal includes a Y signal indicating a luminance component, a U signal indicating a color difference between the luminance component and a blue component, and a V signal indicating a color difference between the luminance component and a red component. Although the YUV signal can employ any YUV data format, the YUV signal may employ the YUV422 format. In the YUV422, signals of two adjacent pixels as a single set share some information, thus reducing the amount of data while preventing degradation of image quality.

The ISP 4 is connected to the encoder 8 via a multi-bit width (for example, an 8-bit width) data bus 43. The data bus 43 may support the I2C protocol. The ISP 4 and the encoder 8 may establish communication with a connection destination via the data bus 43 in accordance with the I2C protocol. The ISP 4 can transfer the image information of the recording pixel region R2 in the form of a multi-bit (for example, 8-bit) parallel signal to the encoder 8 via bus wiring in accordance with the I2C protocol.

The encoder 8 is connected between the ISP 4 and the connector 7 and functions as an input/output interface with the ISP 4. The input circuit 8a functions as the input interface, and the output circuit 8b functions as the output interface.

The output circuit 8b receives image information of the recording pixel region R2 as a parallel signal. The output circuit 8b performs parallel-serial conversion of the image information of the recording pixel region R2 to make the image information of the recording pixel region R2 in the form of a serial signal. The output circuit 8b makes the serial signal differential to generate differential signals SIG+, SIG−, and outputs the differential signals SIG+, SIG− to the decoder 112 of the camera ECU 110 via the connector 7 and the cable 20.

The non-volatile memory 5 is connected to the ISP 4 via a control line 51. The control line 51 may support the serial peripheral interface (SPI) protocol. The ISP 4 and the non-volatile memory 5 may establish communication with a connection destination via the control line 51 in accordance with the SPI protocol.

For example, the ISP 4 causes the non-volatile memory 5 to store information on the position of the distortion center DC via the control line 51. The position of the distortion center DC may include the pixel coordinates (Cx, Cy) of the distortion center DC. The ISP 4 reads the position of the distortion center DC from the non-volatile memory 5 via the control line 51.

The ISP 4 is connected to the encoder 8 via a control line 45. The control line 45 may support the I2C protocol. The ISP 4 and the encoder 8 both may establish communication with a connection destination via the control line 45 in accordance with the I2C protocol. The ISP 4 can supply or receive a serial signal to or from the encoder 8 in accordance with the I2C protocol.

For example, the ISP 4 receives a serial signal indicating information on the position of the distortion center DC from the encoder 8 via the control line 45. The ISP 4 supplies the serial signal indicating the information on the position of the distortion center DC to the encoder 8 via the control line 45.

In the encoder 8, the output circuit 8b receives the serial signal indicating the information on the position of the distortion center DC from the ISP 4. The output circuit 8b may transmit the image information of the recording pixel region R2 and the information on the position of the distortion center DC to the camera ECU 110 in a time-division manner in accordance with a serial communication (for example, C2B (registered trademark)) standard. The output circuit 8b may add the serial signal indicating the information on the position of the distortion center DC before or after a serial signal indicating the image information of the recording pixel region R2. The output circuit 8b can differentiate the serial signal indicating the information on the position of the distortion center DC to generate differential signals SIG+, SIG−, and output the differential signals SIG+, SIG− to the decoder 112 of the camera ECU 110 via the connector 7 and the cable 20.

In the encoder 8, when the input circuit 8a receives the serial signal indicating the information on the position of the distortion center DC from the camera ECU 110 via the cable 20, the input circuit 8a can transfer the serial signal indicating the information on the position of the distortion center DC to the ISP 4 via the control line 45.

Figure 6:
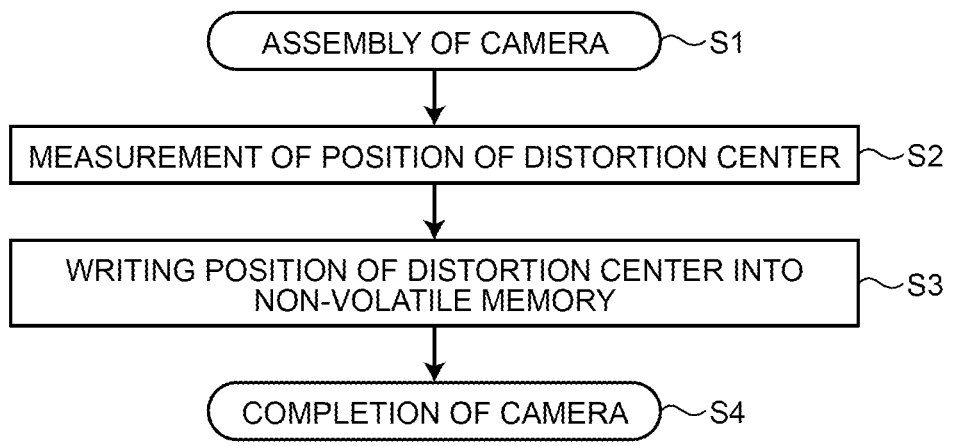
FIG. 6 is a flowchart illustrating a method for manufacturing the vehicular camera according to the first embodiment.

Next, a method for manufacturing the vehicular camera 1 will be described using FIG. 6. FIG. 6 is a flowchart illustrating the method for manufacturing the vehicular camera 1.

The vehicular camera 1 is assembled (S1). For example, the housing 31 and the connector 7 are produced. The imaging sensor 3, the ISP 4, and the non-volatile memory 5 are mounted on the circuit board 34. Furthermore, the oscillator 6, the encoder 8, and the power supply circuit 9 can be mounted on the circuit board 34. The circuit board 34 is attached to the inside of the housing 31. Then, adjustment of the optical axis AX of the optical system 2, adjustment of the focus position of the optical system 2, tilt adjustment of the optical system 2, and the like are performed, and the relative mounting positions of the lens barrel 2b of the optical system 2 and the housing 31 are adjusted. Once the mounting positions are determined, the lens barrel 2b of the optical system 2 is bonded to the housing 31 by an adhesive or the like, whereby the vehicular camera 1 is assembled.

The position of the distortion center DC of the optical system 2 is measured (S2). For example, a testing device (not illustrated) is connected to the connector 7. For example, a grid test pattern is imaged by the imaging sensor 3, and an image of the effective pixel region R1 (see FIG. 5) imaged by the imaging sensor 3 is transferred to the testing device via the ISP 4, the encoder 8, and the connector 7. The testing device may include a monitor screen and the transferred image of the effective pixel region R1 may be projected on the monitor screen. The grid test pattern in the image of the effective pixel region R1 can undergo barrel or pin-cushion distortion. The testing device measures the position of the distortion center DC in the effective pixel region R1. The testing device may determine the pixel position (Cx, Cy) at which the curvature of distortion of the grid test pattern is approximately zero both in the row and column directions as the position of the distortion center DC in the effective pixel region R1.

The position of the distortion center DC is written into the non-volatile memory 5 (S3). For example, the testing device writes a result of measurement of the position of the distortion center DC into the non-volatile memory 5 via the connector 7, the encoder 8, and the ISP 4. The information on the pixel position (Cx, Cy) of the distortion center DC may be written into the non-volatile memory 5.

Upon receiving a notification of the writing completion from the non-volatile memory 5 via the ISP 4, the encoder 8, and the connector 7, the testing device is removed from the connector 7.

Thus, the vehicular camera 1 is completed (S4). Then, the connector 7 is connected to the camera ECU 110 via the cable 20 and the connector 7 is also connected to the vehicle body 101 via a fixing member. Thus, the vehicular camera 1 is electrically and mechanically installed in the vehicle 100.

Figure 7:
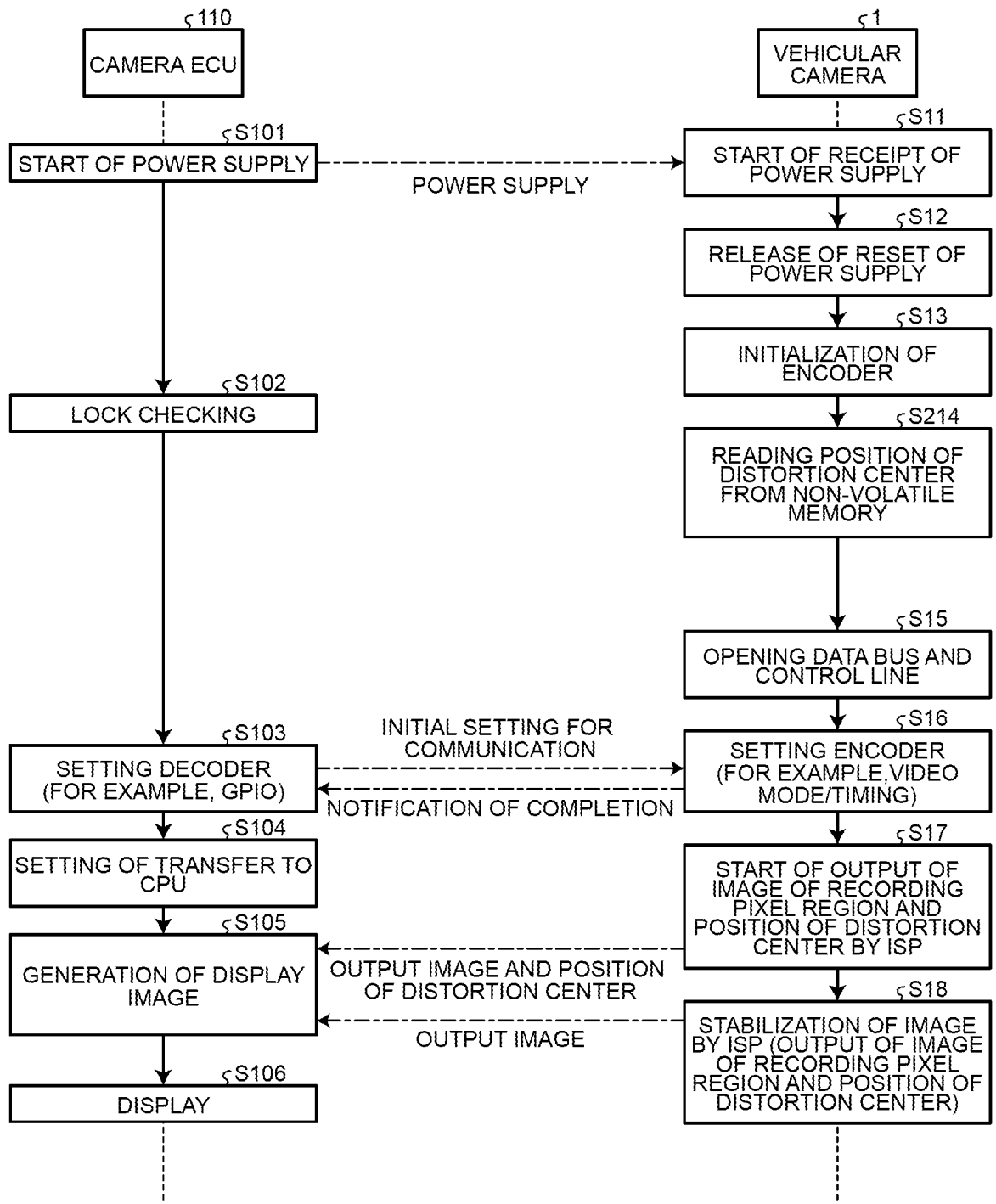
FIG. 7 is a flowchart illustrating an operation of the vehicular camera according to the first embodiment.

Next, an operation of the vehicular camera 1 will be described using FIG. 7. FIG. 7 is a flowchart illustrating the operation of the vehicular camera 1.

When a predetermined condition is satisfied, the camera ECU 110 recognizes that the start-up of power supply of the vehicular camera 1 is requested, and then the camera ECU 110 starts supplying power to the vehicular camera 1 (S101). The predetermined condition may be such that the request for the start-up of power supply of the vehicular camera 1 is received from a host controller (for example, ECU configured to control the entirety of the vehicle 100), or may be such that power received from a battery or a power converter reaches a predetermined threshold. Upon receiving power from the battery or the power converter, the camera ECU 110 uses the power to generate power for the vehicular camera 1 and starts supplying the power to the vehicular camera 1 via the communication lines CL3 and CL4 respectively serving as the ground potential GND and the power supply potential PWR.

In response to this, the power supply circuit 9 of the vehicular camera 1 starts receiving the power from the camera ECU 110 (S11) and goes into a reset state.

In the camera ECU 110, when the level of power supply potential PWR reaches a threshold level and a predetermined time elapses, the main power source 113 locks the control of the level of power supply potential PWR, and the CPU 111 confirms the locking (S102).

In the vehicular camera 1, after the elapse of the predetermined time following the level of the power supply potential PWR reaching the threshold level, the power supply circuit 9 releases the reset state (S12) and starts supplying power to each of the constituents.

The encoder 8 performs initialization (S13) in response to the start of power supply by the power supply circuit 9. The encoder 8 initializes values of various parameters. For example, the encoder 8 sets a parameter for communication, such as video mode and timing, to an initial value.

The ISP 4 establishes communication with the non-volatile memory 5 via the control line 51 in response to the start of power supply by the power supply circuit 9. The ISP 4 may establish communication with the non-volatile memory 5 via the control line 51 in accordance with the SPI protocol. The ISP 4 reads information on the position of the distortion center DC from the non-volatile memory 5 via the control line 51 (S14). The ISP 4 holds the information on the position of the distortion center DC.

The ISP 4 establishes communication with the encoder 8 via the data bus 43 and the control lines 44, 45. The ISP 4 may establish communication with the encoder 8 via each of the data bus 43 and the control lines 44, 45 in accordance with the I2C protocol. Thus, communication via the data bus 43 and the control lines 44, 45 are opened (S15).

In the camera ECU 110, the decoder 112 makes a setting to communicate with the vehicular camera 1 (S103). For example, the decoder 112 assigns general purpose input output (GPIO) terminals 112a, 112b to be connected to the communication lines CL1, CL2 to terminals for serial communication with the vehicular camera 1. The decoder 112 sends parameters for initial setting for communication to the encoder 8 via the terminals 112a, 112b, the communication lines CL1, CL2, the connection terminals 21, 22, and the connection terminals 71, 72. The parameters for initial setting for communication include set values of communication parameters, such as video mode and timing.

In the vehicular camera 1, upon receiving the parameters for initial setting for communication, the encoder 8 sets communication parameters in accordance with the parameters for initial setting for communication (S16). For example, the encoder 8 changes values of the communication parameters, such as video mode and timing, from initial values to set values included in the parameters for initial setting for communication. Upon completing the setting, the encoder 8 sends a notification of the completion to the decoder 112 via the connection terminals 71, 72, the connection terminals 21, 22, the communication lines CL1, CL2, and the terminals 112a, 112b.

In the camera ECU 110, the decoder 112 receives the notification of the completion. Thus, the communication between the encoder 8 and the decoder 112 via the cable 20 can be established.

The decoder 112 establishes communication with the CPU 111 in the camera ECU 110. The decoder 112 may establish communication with the CPU 111 in accordance with the mobile industry processor interface (MIPI). Upon establishing communication with the CPU 111, the decoder 112 sets a parameter for transferring an image received from the vehicular camera 1 to the CPU 111 (S104). The parameter for the transfer may include a value of frame rate. The frame rate of transfer between the decoder 112 and the CPU 111 is greater than the frame rate of communication between the decoder 112 and the encoder 8 via the cable 20.

Figure 8A:
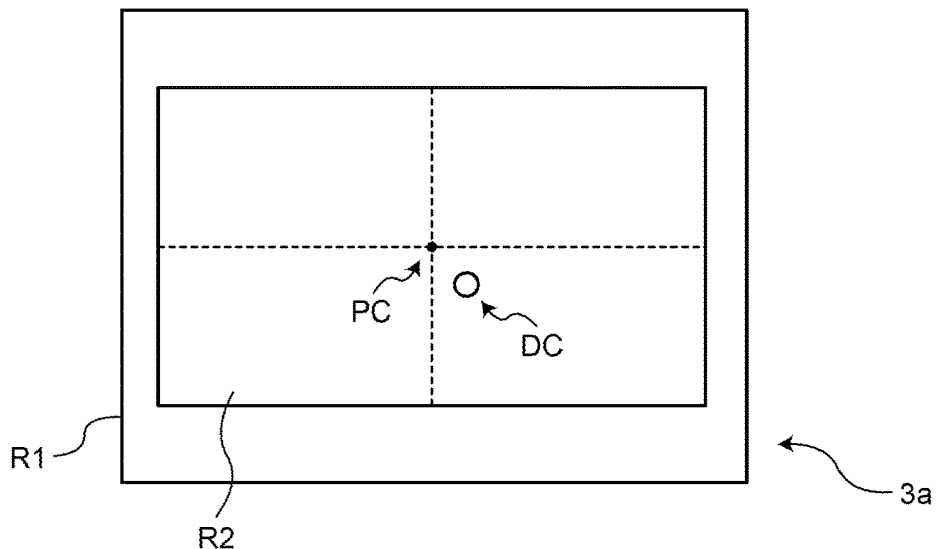
FIGS. 8A to 8C are diagrams each illustrating an operation of the vehicular camera according to the first embodiment.
Figure 8B:
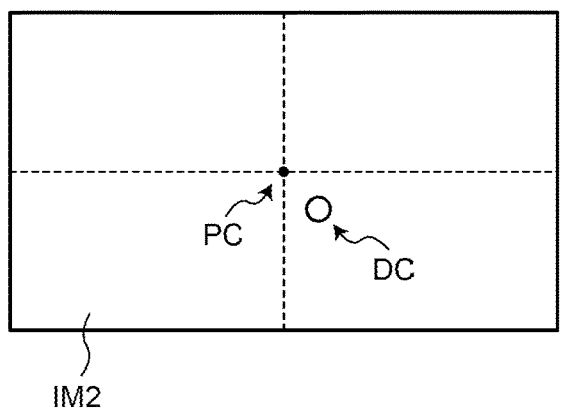
Figure 8C:
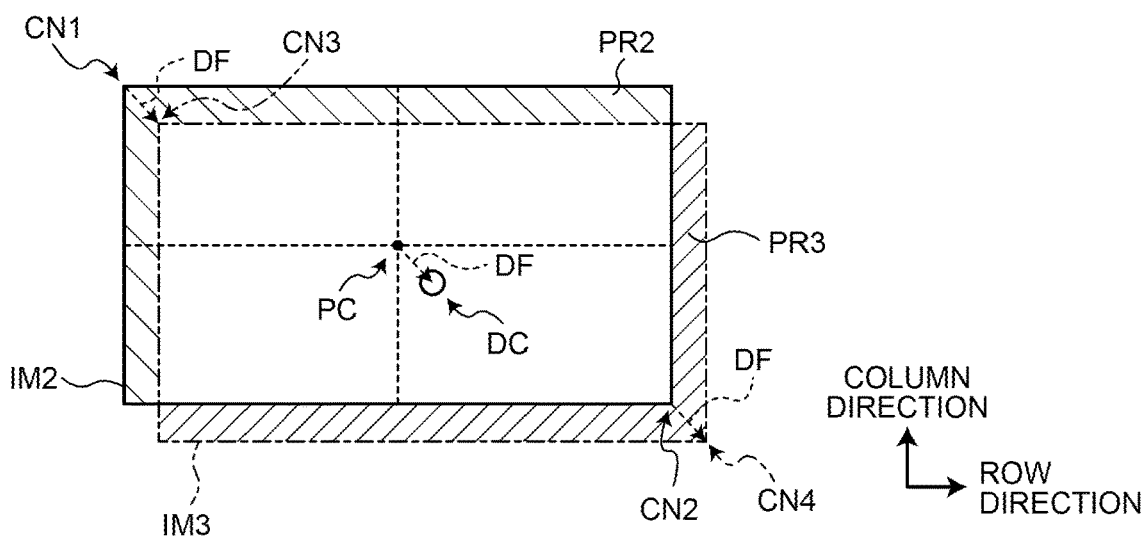

In the vehicular camera 1, the ISP 4 controls the imaging sensor 3 to start an imaging operation. In response to this, as illustrated in FIG. 8A, the imaging sensor 3 acquires a subject image in the effective pixel region R1 corresponding to the entirety of the pixel array 3a, and selectively outputs a pixel signal from the recording pixel region R2, which is a part of the effective pixel region R1. FIG. 8A to FIG. 8C are diagrams illustrating the operation of the vehicular camera 1. The position of the center PC of the recording pixel region R2 is displaced from the position of the distortion center DC.

The ISP 4 acquires a signal of the recording pixel region R2 from the imaging sensor 3. The ISP 4 applies predetermined processing to the signal of the recording pixel region R2 to generate an image IM2 of the recording pixel region R2 as illustrated in FIG. 8B. The position of the center PC of the image IM2 corresponds to the position of the center PC of the recording pixel region R2. The position of the center PC of the image IM2 is displaced from the position of the distortion center DC in the image IM2. The ISP 4 starts outputting the image (output image) IM2 of the recording pixel region R2 and the position of the distortion center DC to the camera ECU 110 via the encoder 8, the connector 7 and the cable 20 (S17).

In the camera ECU 110, the CPU 111 receives the image (output image) IM2 of the recording pixel region R2 and the position of the distortion center DC from the vehicular camera 1 via the cable 20 and the decoder 112. The CPU 111 generates a display image to be output to a predetermined display by using the image (output image) IM2 of the recording pixel region R2 and the position of the distortion center DC (S105). The predetermined display may be the display 102 (see FIG. 1).

For example, the position of the center PC of the recording pixel region R2 is set in advance in the camera ECU 110. The position of the center PC of the recording pixel region R2 corresponds to a pixel position of the center PC of the recording pixel region R2 in the effective pixel region R1.

Upon receiving the image IM2 of the recording pixel region R2 and the position of the distortion center DC, the CPU 111 acquires the position of the center PC of the recording pixel region R2. The CPU 111 generates a display image IM3 as illustrated in FIG. 8C, in accordance with the image IM2 of the recording pixel region R2, the position of the distortion center DC, and the position of the center PC. The center of the display image IM3 is in agreement with the distortion center DC, and the display image IM3 has the same number of pixels ($X_2 \times Y_2$ illustrated in FIG. 5) as that of the recording pixel region R2.

While using the image IM2, the CPU 111 executes arithmetic processing for determining an image having the same number of pixels as that of the recording pixel region R2 and having the distortion center DC at its center. For example, the CPU 111 determines a difference DF between the pixel position of the center PC and the pixel position of the distortion center DC in the effective pixel region R1. The CPU 111 shifts a pixel position of an upper left corner CN1 of the recording pixel region R2 in FIG. 8C by the difference DF and assigns the shifted pixel position to an upper left corner CN3 of the display image IM3. The CPU 111 shifts a pixel position of a lower right corner CN2 of the recording pixel region R2 in FIG. 8C by the difference DF and assigns the shifted pixel position to a lower right corner CN4 of the display image IM3. Thus, the CPU 111 generates the display image IM3 defined by the corners CN3 and CN4.

In other words, the CPU 111 deletes a partial region PR2 from the image IM2 and adds a partial region PR3 to generate the display image IM3. In FIG. 8C, the display image IM3 is enclosed with a dot-and-dash line. In FIG. 8C, the partial region PR2 is hatched with larger pitches. In FIG. 8C, the partial region PR3 is hatched with smaller pitches. When generating the display image IM3, the CPU 111 may interpolate a pixel value of a single-color (for example, blue or gray) indicating the lack of image information in the partial region PR3.

In the vehicular camera 1, while applying predetermined processing to the image IM2 to stabilize the image IM2 (S18), the ISP 4 continues to output the image IM2 of the recording pixel region R2. The predetermined processing includes exposure adjustment, white balance adjustment, gain adjustment, gamma correction, and the like.

In the camera ECU 110, the CPU 111 supplies the display image IM3 to a predetermined display (for example, the display 102) in response to the stabilization of the image IM2 from the vehicular camera 1. The predetermined display displays the display image IM3 (S106).

As described above, in the first embodiment, the vehicular camera 1 reads the position of the distortion center DC from the non-volatile memory 5 in response to the start-up of the imaging sensor 3, and outputs the output image of the recording pixel region R2 being a part of the effective pixel region R1 and the position of the distortion center DC to the camera ECU 110 via the cable 20. Thus, the output image can be transmitted to the camera ECU 110 via the cable 20 at a speed equal to or lower than the upper-limit frequency Fth, whereby a predetermined frame rate required for the vehicular camera 1 can be satisfied. In addition to the output image, the position of the distortion center DC is transmitted to the camera ECU 110, whereby the camera ECU 110 can generate the display image IM3 having the distortion center DC as its center and having the same number of pixels (for example, $X_2 \times Y_2$) as that of the recording pixel region R2. As a result, while the predetermined frame rate required for the vehicular camera 1 is satisfied, a display image in which the position of the distortion center DC is appropriately adjusted can be displayed on a predetermined display (for example, the display 102).

Second Embodiment

Next, the vehicular camera 1 according to a second embodiment will be described. Hereinafter, descriptions will be provided while focusing on points different from the first embodiment.

In the first embodiment, the configuration and operation are illustrated in which the image IM2 of the recording pixel region R2 and the position of the distortion center DC with their centers displaced from each other are transmitted from the vehicular camera 1 to the vehicle 100 side. In contrast, in the second embodiment, a configuration and an operation are illustrated in which the image IM2 of the recording pixel region R2 and the position of the distortion center DC with their centers being in agreement with each other are transmitted to the vehicle 100 side.

Figure 9:
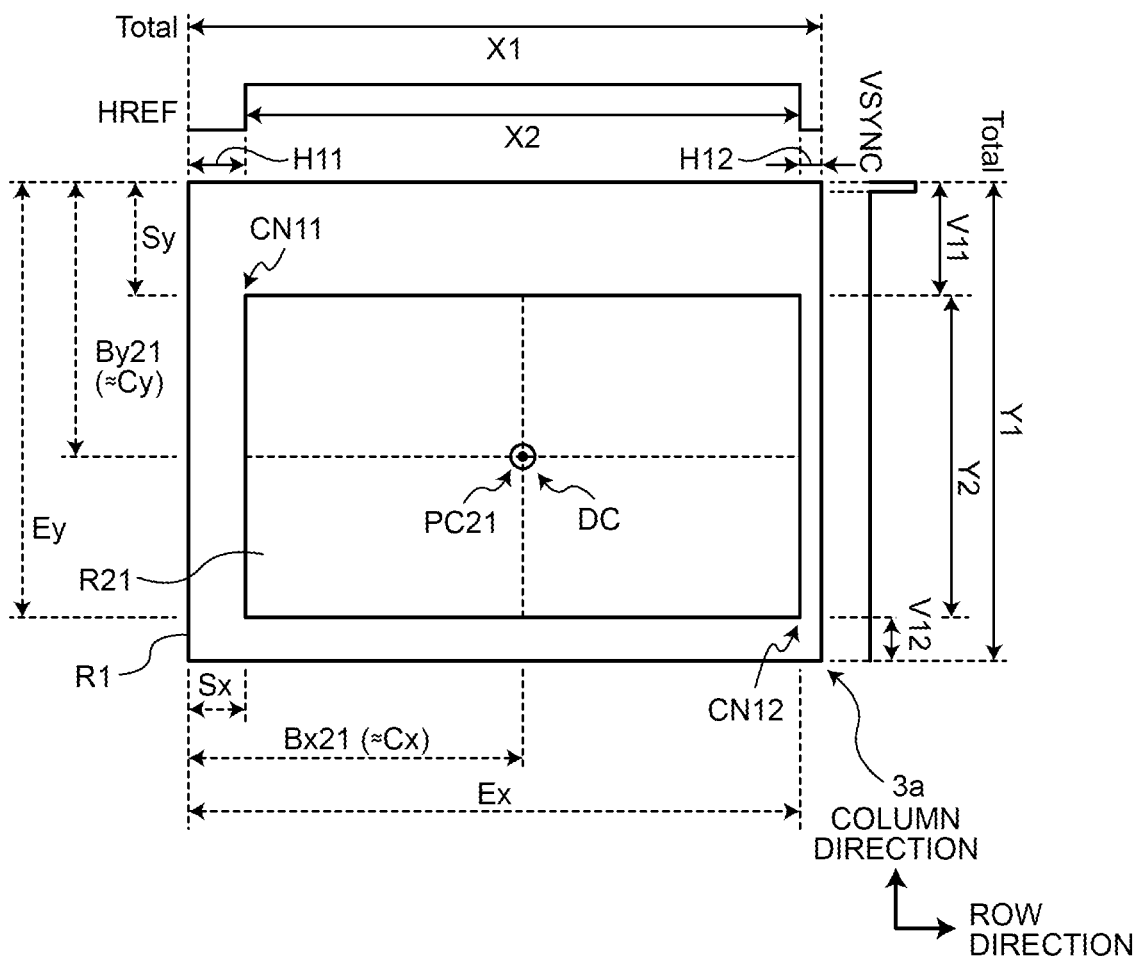
FIG. 9 is a diagram illustrating an effective pixel region and a recording pixel region of a pixel array in a second embodiment.

In the vehicular camera 1, the non-volatile memory 5 stores the position of a recording pixel region R21 illustrated in FIG. 9, in place of the position of the distortion center DC. FIG. 9 is a diagram illustrating the effective pixel region R1 of the pixel array 3a and the recording pixel region R21. The position of the recording pixel region R21 may be the position of the effective pixel region R1 in the recording pixel region R21.

The center PC21 of the recording pixel region R21 is approximately in agreement with the distortion center DC.

The pixel coordinates of the distortion center DC are expressed as (Cx, Cy). The pixel coordinates (Bx21, By21) of the center PC21 of the recording pixel region R21 can be set so as to satisfy the following Formula 6.

$$Bx21 \approx Cx, By21 \approx Cy \qquad \text{Formula 6}$$

The position of the center PC21 of the recording pixel region R21 is displaced from the position of the center of the effective pixel region R1. Accordingly, the following Formula 7 to Formula 9 hold.

$$X_1 = H_{11} + X_2 + H_{12} \qquad \text{Formula 7}$$

$$Y_1 = V_{11} + Y_2 + V_{12} \qquad \text{Formula 8}$$

$$H_{11} \neq H_{12}, V_{11} \neq V_{12} \qquad \text{Formula 9}$$

In Formula 7, $H_{11}$ is the number of horizontal blanking pixels on the left side of the recording pixel region R21 in FIG. 9. $H_{12}$ is the number of horizontal blanking pixels on the right side of the recording pixel region R21 in FIG. 9. In Formula 8, $V_{11}$ is the number of vertical blanking pixels on the upper side of the recording pixel region R21 in FIG. 9. $V_{12}$ is the number of vertical blanking pixels on the lower side of the recording pixel region R21 in FIG. 9.

FIG. 9 illustrates a case in which the following Formula 10 holds.

$$H_{11} > H_{12}, V_{11} > V_{12} \qquad \text{Formula 10}$$

The ISP 4 sets a position of the recording pixel region R21. The ISP 4 may set the position of the recording pixel region R21 by adjusting the horizontal synchronous signal HREF, the vertical synchronous signal Vsync, the number of vertical blanking pixels $V_{11}$, $V_{12}$, and the like.

The position of the recording pixel region R21 is stored in the non-volatile memory 5 in a non-volatile manner. The non-volatile memory 5 can store a pixel position of a portion representative of the recording pixel region R21 as the position of the recording pixel region R21. The non-volatile memory 5 can store pixel positions of two corners that are diagonally opposite each other, as the pixel position of the portion representative of the recording pixel region R21. For example, the non-volatile memory 5 may store the pixel position of an upper left corner CN11 and the pixel position of a lower right corner CN12 in FIG. 9.

The pixel position of the corner CN11 is expressed by the pixel coordinates (Sx, Sy) of the corner CN11. The pixel coordinates (Sx, Sy) of the corner CN11 satisfy the following Formula 11.

$$Sx = H_{11}, Sy = V_{11} \qquad \text{Formula 11}$$

The pixel position of the corner CN12 is expressed by the pixel coordinates (Ex, Ey) of the corner CN12. The pixel coordinates (Ex, Ey) of the corner CN12 satisfy the following Formula 12.

$$Ex = H_{11} + X_2 = X_1 - H_{12}, Ey = V_{11} + Y_2 = Y_1 - V_{12} \qquad \text{Formula 12}$$

Here, the center PC21 of the recording pixel region R21 is the midpoint of a diagonal line connecting the corner CN11 to the corner CN12. Accordingly, the row number Bx21 of the pixel position of the center PC21 is the average of the row number Sx of the pixel position of the corner CN11 and the row number Ex of the pixel position of the corner CN12. The column number By21 of the pixel position of the center PC21 is the average of the column number Sy of the pixel position of the corner CN11 and the column number Ey of the pixel position of the corner CN12. In other words, the following Formula 13 holds.

$$Bx21 = (Sx + Ex)/2, By21 = (Sy + Ey)/2 \qquad \text{Formula 13}$$

Based on Formula 6 and Formula 13, the following Formula 14 holds for the pixel coordinates (Cx, Cy) of the distortion center DC.

$$Cx \approx (Sx + Ex)/2, Cy \approx (Sy + Ey)/2 \qquad \text{Formula 14}$$

As shown in Formula 14, the row number Cx of the pixel position of the distortion center DC is approximately equal to the average of the row number Sx of the pixel position of the corner CN11 and the row number Ex of the pixel position of the corner CN12. The column number Cy of the pixel position of the distortion center DC is approximately equal to the average of the column number Sy of the pixel position of the corner CN11 and the column number Ey of the pixel position of the corner CN12.

Figure 10:
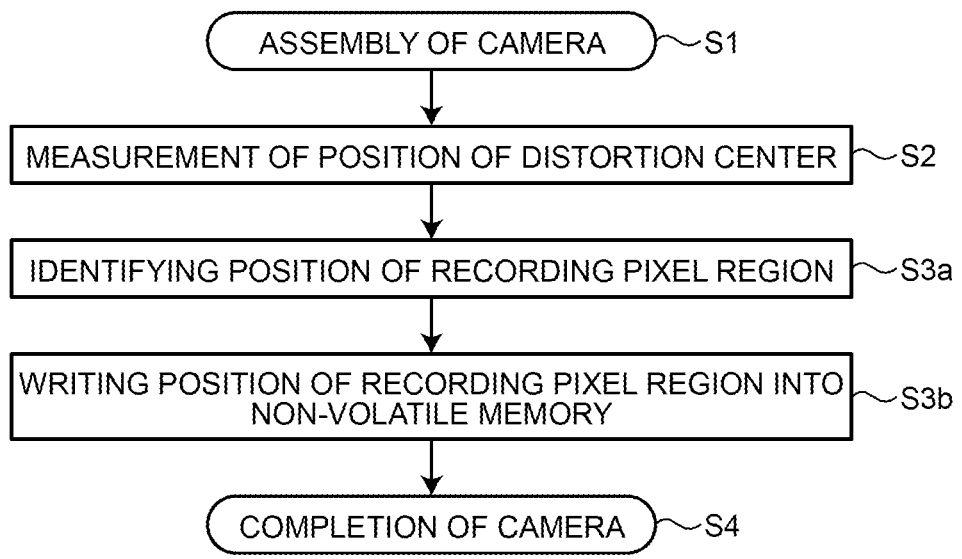
FIG. 10 is a flowchart illustrating a method for manufacturing a vehicular camera according to the second embodiment.

A method for manufacturing the vehicular camera 1 is different from that according to the first embodiment in the following points, as illustrated in FIG. 10. FIG. 10 is a flowchart illustrating the method for manufacturing the vehicular camera 1.

After the completion of S1 and S2, the position of the recording pixel region R21 in the effective pixel region R1 is identified (S3a). For example, a testing device supplies a measurement result of the position of the distortion center DC to the ISP 4 via the connector 7 and the encoder 8 in the vehicular camera 1. The ISP 4 identifies the position of the recording pixel region R21 so that the center PC21 of the recording pixel region R21 is approximately in agreement with the distortion center DC, based on the measurement result of the position of the distortion center DC. The identified position of the recording pixel region R21 may include the pixel positions of two corners diagonally opposite each other. For example, the identified position of the recording pixel region R21 may include the pixel coordinates (Sx, Sy) of the corner CN11 and the pixel coordinates (Ex, Ey) of the corner CN12. The ISP 4 adjusts the horizontal synchronous signal HREF, the vertical synchronous signal Vsync, the number of vertical blanking pixels $V_{11}$, $V_{12}$, and the like so that the position of the identified recording pixel region R21 is defined (see FIG. 9).

The position of the recording pixel region R21 is written into the non-volatile memory 5 (S3b). For example, as a position of a pixel region to be read at the start-up, the ISP 4 writes the position of the recording pixel region R21 into the non-volatile memory 5. The pixel positions of two corners diagonally opposite each other may be written into the non-volatile memory 5. For example, the pixel coordinates (Sx, Sy) of the corner CN11 and the pixel coordinates (Ex, Ey) of the corner CN12 may be written thereinto.

Upon receiving a notification of writing completion from the ISP 4 via the encoder 8 and the connector 7, the testing device is removed from the connector 7.

Thus, the vehicular camera 1 is completed (S4). Then, the connector 7 is connected to the camera ECU 110 via the cable 20 and the connector 7 is also connected to the vehicle body 101 via a fixing member. Thus, the vehicular camera 1 is electrically and mechanically installed in the vehicle 100.

Figure 11:
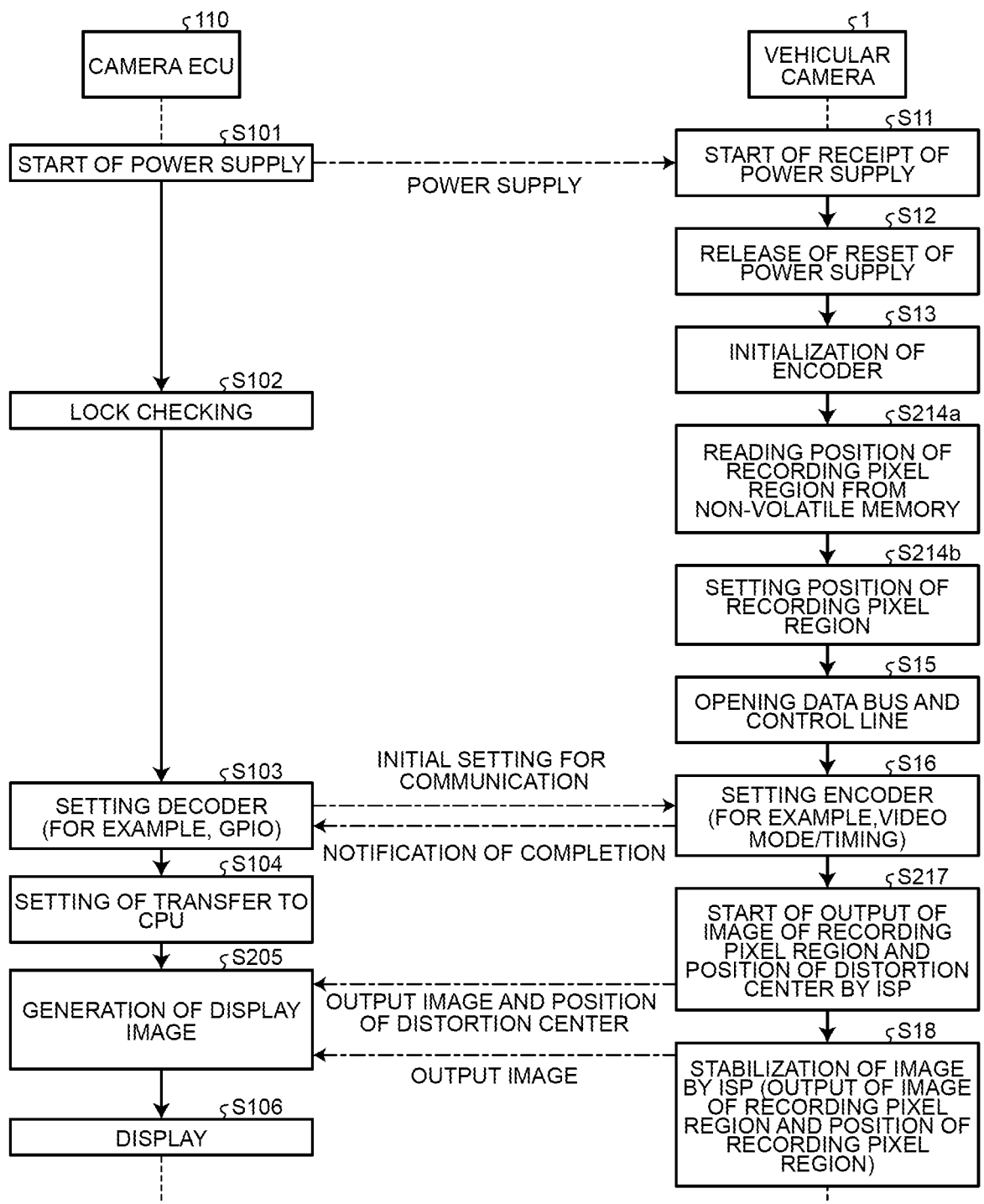
FIG. 11 is a flowchart illustrating an operation of the vehicular camera according to the second embodiment.

The operation of the vehicular camera 1 according to the second embodiment is different from that according to the first embodiment in the following points, as illustrated in FIG. 11. FIG. 11 is a flowchart illustrating the operation of the vehicular camera 1.

After S101, S102, and S11 to S13 are performed in the same manner as that in the first embodiment, in the vehicular camera 1, the ISP 4 establishes communication with the non-volatile memory 5 via the control line 51 in response to the start of power supply by the power supply circuit 9. The ISP 4 reads information on the position of the recording pixel region R21 from the non-volatile memory 5 (S214a). The ISP 4 holds the information on the position of the recording pixel region R21.

Figure 12A:
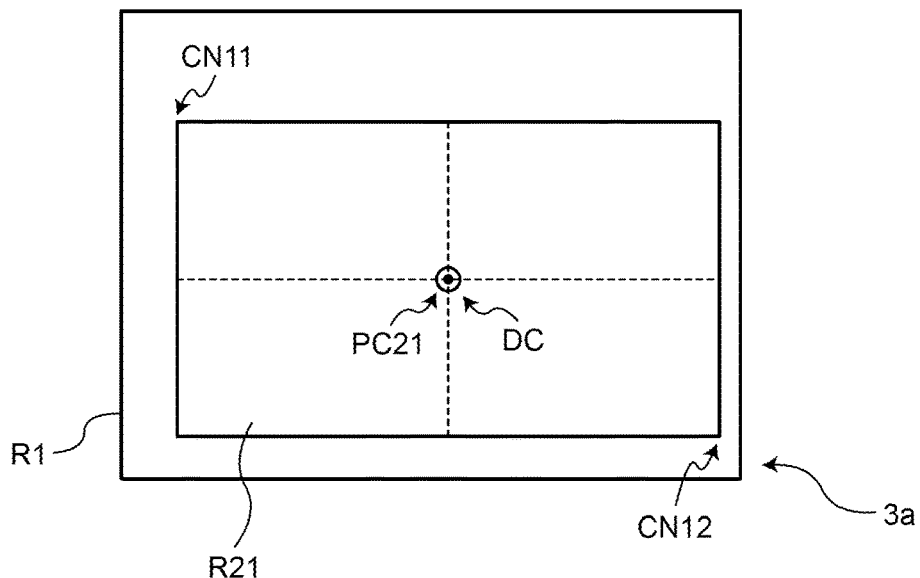
FIGS. 12A to 12C are diagrams each illustrating an operation of the vehicular camera according to the second embodiment.
Figure 12B:
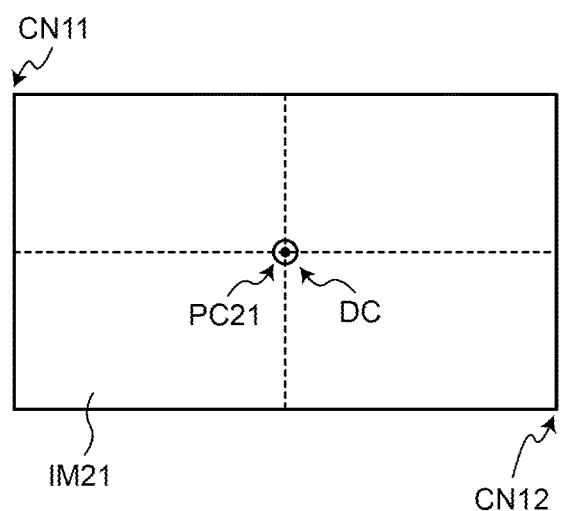
Figure 12C:
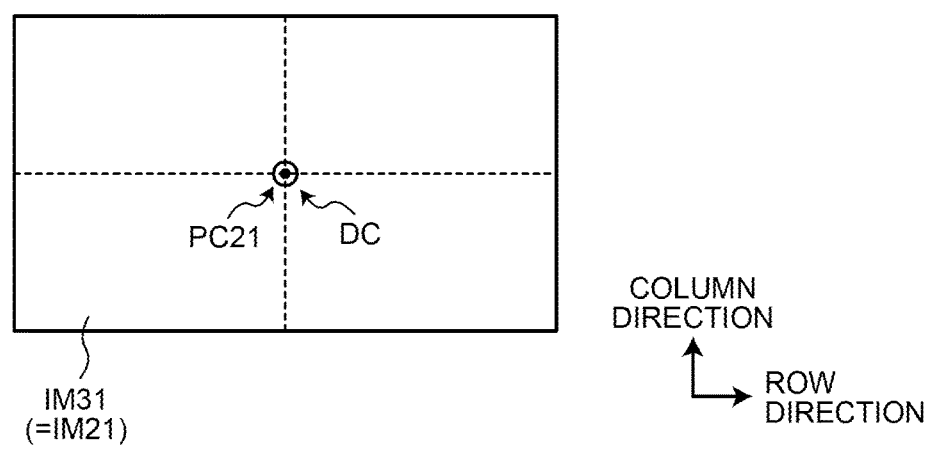

The ISP 4 sets the position of the recording pixel region R21 in the effective pixel region R1 of the pixel array 3a (S214b). The ISP 4 acquires the position of the recording pixel region R21 from the non-volatile memory 5. As the position of the recording pixel region R21, the ISP 4 may acquire a pixel position of a portion representative of the recording pixel region R21 in the effective pixel region R1. The ISP 4 may acquire pixel positions of two corners diagonally opposite each other as the pixel position of the portion representative of the recording pixel region R21. For example, the ISP 4 may acquire the pixel position of the upper left corner CN11 and the pixel position of the lower right corner CN12 in FIG. 12A. FIG. 12A to FIG. 12C illustrate an operation of the vehicular camera 1 according to the second embodiment.

The ISP 4 sets the position of the recording pixel region R21 to the position of the recording pixel region R21 read from the non-volatile memory 5. The ISP 4 may set the position of the recording pixel region R21 by adjusting the horizontal synchronous signal HREF, the vertical synchronous signal Vsync, the number of vertical blanking pixels $V_{11}$, $V_{12}$, and the like. Thus, as illustrated in FIG. 12A, the position of the recording pixel region R21 is set such that its center PC21 is approximately in agreement with the distortion center DC.

Then, after S15, S103, and S16 are performed in the same manner as in the first embodiment, the ISP 4 controls the imaging sensor 3 to start an imaging operation in the vehicular camera 1. In response to this, the imaging sensor 3 acquires a subject image in the effective pixel region R1 corresponding to the entirety of the pixel array 3a, as illustrated in FIG. 12A, and selectively outputs a pixel signal from the recording pixel region R21 being a part of the effective pixel region R1. The position of the center PC21 of the recording pixel region R21 is approximately in agreement with the position of the distortion center DC.

The ISP 4 acquires the signal of the recording pixel region R21 from the imaging sensor 3. The ISP 4 applies predetermined processing to the signal of the recording pixel region R21 to generate an image IM21 of the recording pixel region R21 illustrated in FIG. 12B. The position of the center PC21 of the image IM21 corresponds to the position of the center PC21 of the recording pixel region R2. The center PC21 of the image IM21 is approximately in agreement with the distortion center DC in the image IM21. The ISP 4 starts outputting the image (output image) IM21 of the recording pixel region R21 and the position of the recording pixel region R21 to the camera ECU 110 via the encoder 8, the connector 7, and the cable 20 (S217).

The ISP 4 can output a pixel position of a portion representative of the recording pixel region R21 as the position of the recording pixel region R21. The ISP 4 can output pixel positions of two corners diagonally opposite each other as the pixel positions of the portion representative of the recording pixel region R21. For example, the ISP 4 may output the pixel position of an upper left corner CN11 and the pixel position of a lower right corner CN12 in FIG. 12B.

In the camera ECU 110, the CPU 111 receives the image (output image) IM21 of the recording pixel region R21 and the position of the recording pixel region R21 from the vehicular camera 1 via the cable 20 and the decoder 112. The CPU 111 generates a display image for outputting to a predetermined display by using the image (output image) IM21 of the recording pixel region R21 (S205).

The position of the distortion center DC is set in advance in the camera ECU 110. The position of the distortion center DC corresponds to the pixel position of the distortion center DC in the image IM21. The CPU 111 may confirm whether the center PC21 of the image IM21 is approximately in agreement with the distortion center DC in accordance with the position of the recording pixel region R21 and the position of the distortion center DC. In response to this, the CPU 111 may generate a display image IM31 by using the image IM21 of the recording pixel region R21 as it is, as illustrated in FIG. 12B and FIG. 12C. The display image IM31 has the distortion center DC as a center and has the same number of pixels (for example, $X_2 \times Y_2$ illustrated in FIG. 9) as that of the recording pixel region R21.

When generating the display image IM31, the image IM21 of the recording pixel region R21 is used as it is, whereby the CPU 111 can omit arithmetic processing (see FIG. 8C) for determining an image having the distortion center DC as a center and having the same number of pixels as that of the recording pixel region R21. The CPU 111 can generate the display image IM31 while avoiding the occurrence of a partial region PR2 to be deleted (see FIG. 8C). The CPU 111 can generate the display image IM31 not including a partial region PR3 (see FIG. 8C) that substantially lacks image information. Thus, the image quality of the display image IM31 can be enhanced.

In the vehicular camera 1, while applying predetermined processing to the image IM21 to stabilize the image IM21 (S18), the ISP 4 outputs the image IM21 of the recording pixel region R21 and the position of the distortion center DC. The predetermined processing includes exposure adjustment, white balance adjustment, gain adjustment, gamma correction, and the like.

In the camera ECU 110, the CPU 111 supplies the display image IM31 to a predetermined display (for example, the display 102) in response to the stabilization of the image IM21 in the vehicular camera 1. The predetermined display displays the display image IM31 (S106).

As described above, in the second embodiment, the vehicular camera 1 reads the position of the recording pixel region R21 from the non-volatile memory 5 in response to the start-up of the imaging sensor 3, and outputs the output image of the recording pixel region R21 being a part of the effective pixel region R1 and the position of the recording pixel region R21 to the camera ECU 110 via the cable 20. Thus, the output image can be transmitted to the camera ECU 110 via the cable 20 at a speed equal to or lower than the upper-limit frequency Fth, whereby a predetermined frame rate required for the vehicular camera 1 can be satisfied. In addition to the output image, the position of the recording pixel region R21 is transmitted to the camera ECU 110, whereby the camera ECU 110 can confirm that the center PC21 of the recording pixel region R21 is in agreement with the distortion center DC, and the display image IM3 can be generated by using the image IM21 of the recording pixel region R21 as it is. As a result, while the predetermined frame rate required for the vehicular camera 1 is satisfied, a display image in which the position of the distortion center DC is appropriate can be displayed on a predetermined display (for example, the display 102).

Third Embodiment

Next, the vehicular camera 1 according to a third embodiment will be described. Hereinafter, descriptions will be provided while focusing on points different from the first embodiment and the second embodiment.

The second embodiment illustrates the configuration in which the position of the image IM21 of the recording pixel region R21, the position corresponding to the distortion center DC, is stored in the vehicular camera 1 during manufacture. In contrast, the third embodiment illustrates a configuration in which the position of an image IM121 of a recording pixel region R121 in accordance with a calibration result after manufacture is stored in the vehicular camera 1.

For example, the vehicular camera 1 is manufactured by the same method as that illustrated in FIG. 10, and, when the vehicular camera 1 is installed in the vehicle 100, calibration illustrated in FIG. 13 is performed. FIG. 13 is a flowchart illustrating the calibration for the vehicular camera 1.

When a plurality of the cameras 1_1, 1-2, 1_3, 1_4 is installed in the vehicle 100, a plurality of the camera ECUs 110 may be provided in the vehicle 100 to correspond to the cameras 1_1 to 1_4, or one camera ECU 110 may be provided in the vehicle 100 to be shared among the vehicular cameras 1_1 to 1_4. Hereinafter, an example of calibration is illustrated in which one camera ECU 110 is provided to be shared among the vehicular cameras 1_1 to 1_4. In FIG. 13, a sequence on the left side indicates an operation of the shared camera ECU 110, and a sequence on the right side indicates an operation of the vehicular camera 1 as a control target.

Figure 14C:
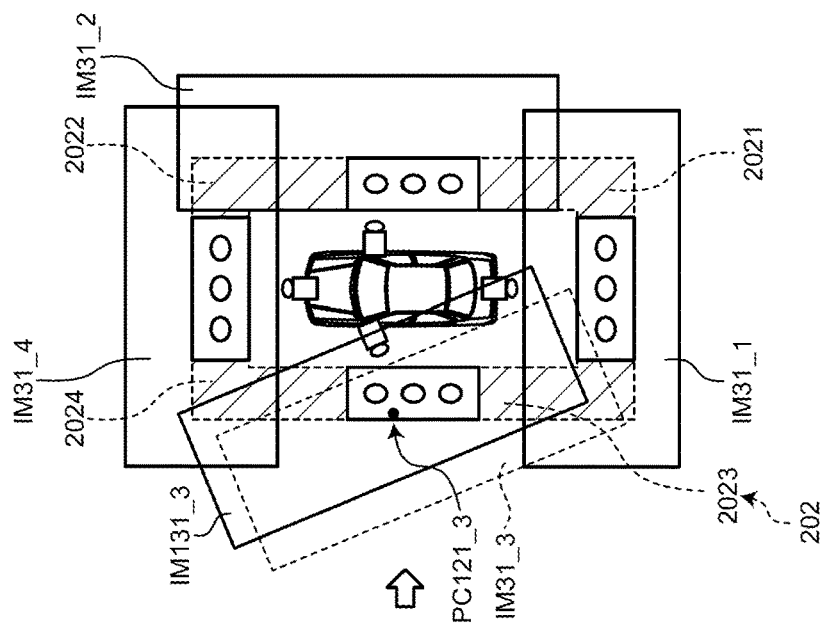
FIGS. 14A to 14C are diagrams each illustrating the calibration of the vehicular camera according to the third embodiment.
Figure 14B:
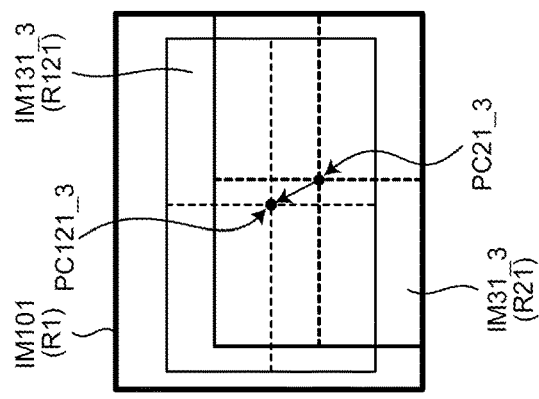
Figure 14A:
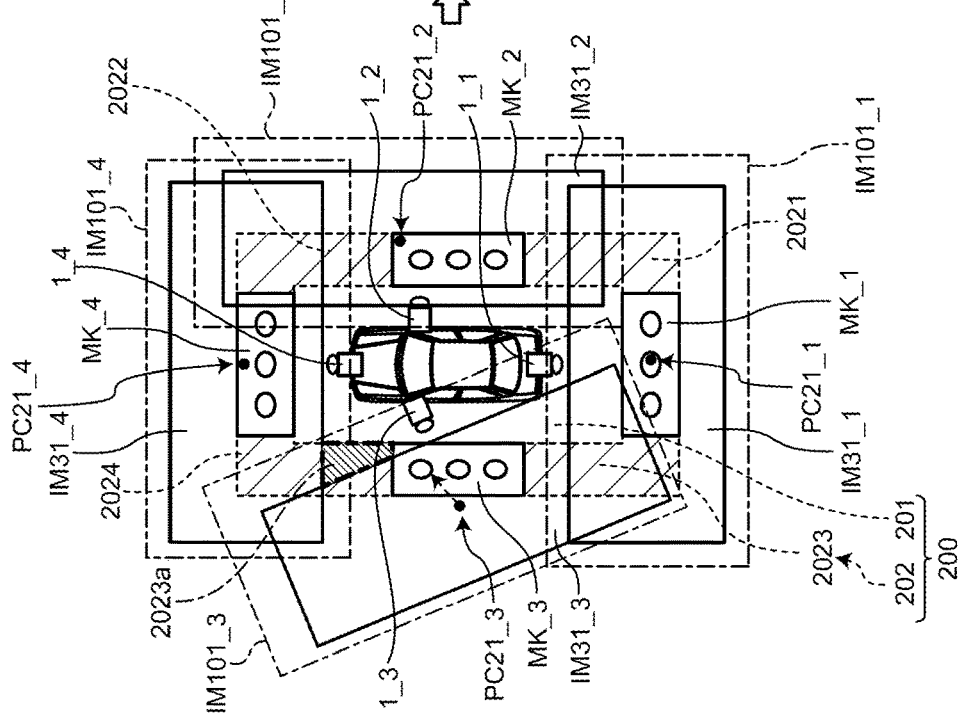

S101 to S205 and S11 to S18 are performed in the same manner as for the operations illustrated in FIG. 11 in the second embodiment, and then, for example, the vehicle 100 is parked in an inspection area 200 on a road surface as illustrated in FIG. 14A. FIG. 14A to FIG. 14C are diagrams illustrating calibration of the vehicular camera 1. FIG. 14A is a top view of the vehicle 100 parked in the inspection area 200.

The inspection area 200 includes a parking area 201 and a peripheral area 202. The parking area 201 is an area in which the vehicle 100 should be parked. The parking area 201 may have a shape (for example, an approximately rectangular shape) corresponding to the flat shape of the vehicle 100 in the plan view. FIG. 14A illustrates a case in which the vehicle 100 is parked in the parking area 201 so that the front part of the vehicle 100 is oriented toward the upper side of FIG. 14A.

The peripheral area 202 is disposed around the inspection area 200. The peripheral area 202 surrounds the inspection area 200. The peripheral area 202 extends annularly along the outer edge of the inspection area 200. In the case where the inspection area 200 has an approximately rectangular shape, the peripheral area 202 has an approximately rectangular ring shape.

The peripheral area 202 includes a lower-side portion 2021 on the lower side of FIG. 14A, a right-side portion 2022 on the right side of FIG. 14A, a left-side portion 2023 on the left side of FIG. 14A, and an upper-side portion 2024 on the upper side of FIG. 14A.

The lower-side portion 2021, the right-side portion 2022, the left-side portion 2023, and the upper-side portion 2024 include reference markers MK_1, MK_2, MK_3, and MK_4, respectively. The reference markers MK_1, MK_2, MK_3, and MK_4 are disposed near the centers in the longitudinal direction of the lower-side portion 2021, the right-side portion 2022, the left-side portion 2023, and the upper-side portion 2024, respectively.

The reference markers MK_1 to MK_4 respectively correspond to the vehicular cameras 1_1 to 1_4 to be mounted on the vehicle 100, and each of the reference markers MK_1 to MK_4 indicates a reference position of a subject to be imaged by the vehicular cameras 1_1 to 1_4 (for example, a corresponding one of the lower-side portion 2021, the right-side portion 2022, the left-side portion 2023, and the upper-side portion 2024).

Each of the reference markers MK may have a predetermined pattern. In FIG. 14A, a reference marker MK is illustrated having a pattern including a rectangle and a plurality of circles inside the rectangle.

In this state, the camera ECU 110 performs control for detection of the reference marker MK (S307). The camera ECU 110 selects the vehicular camera 1 as a control target from the vehicular cameras 1_1 to 1_4. The camera ECU 110 issues a detection instruction and transmits the detection instruction to the vehicular camera 1 as the control target via the decoder 112 and the cable 20.

In response to the detection instruction, the vehicular camera 1 detects the reference marker MK (S319). In the vehicular camera 1, upon receiving the detection instruction, the encoder 8 transfers the detection instruction to the ISP 4. The ISP 4 controls the imaging sensor 3 to image the reference marker MK in response to the detection instruction. From the imaging sensor 3, the ISP 4 acquires a signal of the effective pixel region R1 being the entirety of the captured image of the reference marker MK. The ISP 4 reads the position of the recording pixel region R21 from the non-volatile memory 5. The ISP 4 outputs the image (output image) IM1 of the effective pixel region R1 and the position of the recording pixel region R21 to the camera ECU 110 via the encoder 8, the connector 7, and the cable 20.

In the camera ECU 110, when the image IM1 from the vehicular camera 1 is transferred, the CPU 111 generates an inspection image IM101 corresponding to the image IM1. The CPU 111 determines the position of a display image IM31 in the inspection image IM101 in accordance with the position of the recording pixel region R21. The CPU 111 may generate a display object (for example, a frame) indicating the position of the display image IM31 in the inspection image IM101. The CPU 111 supplies the inspection image IM101 and the display object to a predetermined display (for example, the display 102). The predetermined display displays the inspection image IM101. The predetermined display may superimpose the display object on the inspection image IM101.

For example, when the vehicular camera 1_1 is a control target, an image IM1_1 of the reference marker MK_1 is acquired by the vehicular camera 1_1, and the camera ECU 110 generates an inspection image 101_1 in accordance with the image IM1_1 of the reference marker MK_1 and a display object indicating the position of a display image IM31_1. The predetermined display can display the inspection image 101_1 and a display object indicating the position of the display image IM31_1 as illustrated in FIG. 14A.

For example, when the vehicular camera 1_2 is a control target, an image IM1_2 of the reference marker MK_2 is acquired by the vehicular camera 1_2, and the camera ECU 110 generates an inspection image 101_2 in accordance with the image IM1_2 of the reference marker MK_2 and a display object indicating the position of a display image IM31_2. The predetermined display can display the inspection image 101_2 and the display object indicating the position of the display image IM31_2 as illustrated in FIG. 14A.

For example, when the vehicular camera 1_3 is a control target, an image IM1_3 of the reference marker MK_3 is acquired by the vehicular camera 1_3, and the camera ECU 110 generates an inspection image 101_3 in accordance with the image IM1_3 of the reference marker MK_3 and a display object indicating the position of a display image IM31_3. The predetermined display can display the inspection image 101_3 and the display object indicating the position of the display image IM31_3 as illustrated in FIG. 14A.

For example, when the vehicular camera 1_4 is a control target, an image IM1_4 of the reference marker MK_4 is acquired by the vehicular camera 1_4, and the camera ECU 110 generates an inspection image 101_4 in accordance with the image IM1_4 of the reference marker MK_4 and a display object indicating the position of a display image IM31_4. The predetermined display can display the inspection image 101_4 and the display object indicating the position of the display image IM31_4 as illustrated in FIG. 14A.

The amount of displacement of the position of the displayed image IM31 from an ideal position is calculated in accordance with the position of the reference marker MK in the inspection image IM101 and the position of the display image IM31 (S308).

In the camera ECU 110, an allowable position condition in the inspection image IM101 is set in advance for the pixel position of each of the reference markers MK_1, MK_2, MK_3, MK_4. The allowable position condition can be experimentally determined in advance as a condition being such that a subject to be imaged (any of a lower-side portion, a right-side portion, a left-side portion, and an upper-side portion) fits within the angle of view of the display image IM31. For example, the allowable position condition includes that the center of the display image IM31 fits within a frame of the reference marker MK. The CPU 111 acquires the pixel position of the reference marker MK in the inspection image IM101 (for example, a range of pixel coordinates of the frame of the reference marker MK) and also acquires the allowable position condition.

When the pixel position of the reference marker MK in the inspection image IM101 satisfies the allowable position condition, the CPU 111 determines that a subject to be imaged fits within the angle of view of the vehicular camera 1 and the amount of displacement of the display image IM31 is zero.

When the vehicular camera 1_1 is a control target, the CPU 111 determines that a center PC21_1 of the display image IM31_1 illustrated in FIG. 14A fits within the frame of the reference marker MK_1 and thereby the pixel position of the reference marker MK_1 satisfies the allowable position condition. In response to this, the CPU 111 determines that the lower-side portion 2021 of the peripheral area 202 fits within the display image IM31_1, and thereby determines that the amount of displacement of the position of the display image IM31_1 from an ideal position is zero.

When the vehicular camera 1_2 is a control target, the CPU 111 determines that a center PC21_2 of the display image IM31_2 illustrated in FIG. 14A fits within the frame of the reference marker MK_2, and thereby determines that the pixel position of the reference marker MK_2 satisfies the allowable position condition. In response to this, the CPU 111 determines that the right-side portion 2022 of the peripheral area 202 fits within the display image IM31_2 and thereby the amount of displacement of the position of the display image IM31_2 from an ideal position is zero.

When the vehicular camera 1_4 is a control target, the CPU 111 determines that a center PC21_4 of the display image IM31_4 illustrated in FIG. 14A fits within the frame of the reference marker MK_4 and thereby the pixel position of the reference marker MK_4 satisfies the allowable position condition. In response to this, the CPU 111 determines that the upper-side portion 2024 of the peripheral area 202 fits within the display image IM31_4, and thereby determines that the amount of displacement of the position of the display image IM31_4 from an ideal position is zero.

When the pixel position of the reference marker MK in the inspection image IM101 does not satisfy the allowable position condition, the CPU 111 determines that the subject to be imaged does not fit within the angle of view of the vehicular camera 1 and then calculates the amount of displacement of the position of the displayed image IM31 from an ideal position.

When the vehicular camera 1_3 is a control target, the CPU 111 determines that a center PC21_3 of the display image IM31_3 illustrated in FIG. 14A does not fit in the frame of the reference marker MK_3 and thereby the pixel position of the reference marker MK_3 does not satisfy the allowable position condition. In response to this, the CPU 111 determines that a part 2023a of the left-side portion 2023 of the peripheral area 202 does not fit in the display image IM31_3, and calculates the amount of displacement of the display image IM31_3 from an ideal position. In FIG. 14A, the part 2023a of the left-side portion 2023 is hatched with oblique lines. The ideal position may be a position satisfying the allowable position condition. The ideal position may be such that the center PC21 of the display image IM31 fits within the frame of the reference marker MK.

Figure 15A:
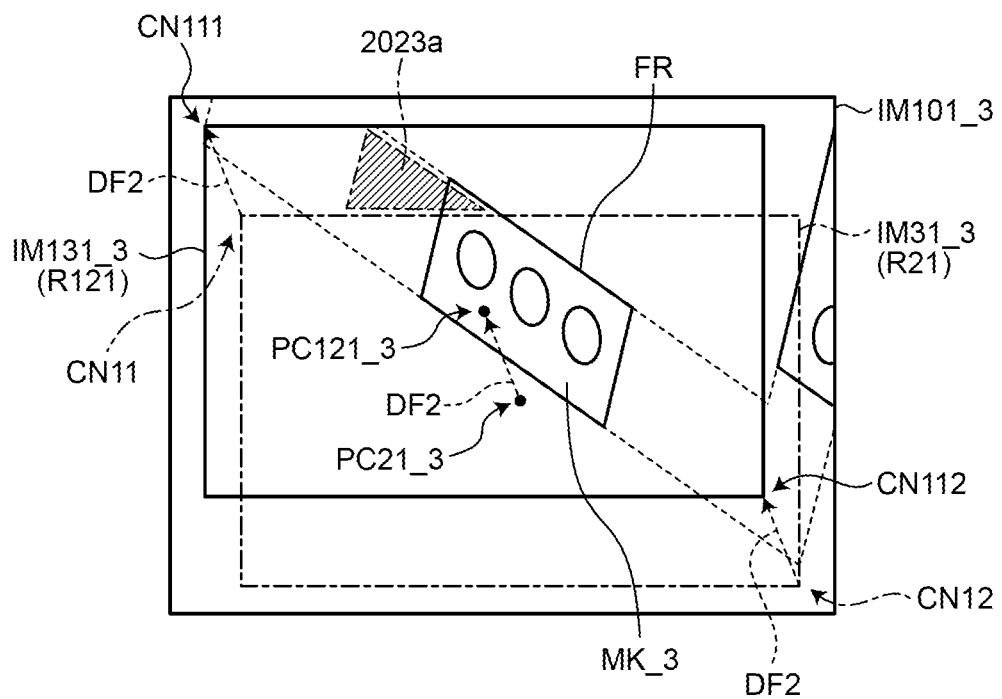
FIG. 15A and FIG. 15B are diagrams each illustrating the calibration of the vehicular camera according to the third embodiment.

For example, as illustrated in FIG. 15A, the CPU 111 acquires the position of a frame FR of the reference marker MK_3 and the position of the display image IM31_3. The CPU 111 determines the center PC21_3 of the display image IM31_3 in accordance with the position of the display image IM31_3. The CPU 111 acquires the pixel position of the upper left corner CN11 and the pixel position of the lower right corner CN12 and determines the pixel position of the center PC21_3 as the midpoint between the corner CN11 and the corner CN12.

In accordance with the position of the frame FR of the reference marker MK_3, the CPU 111 determines the position (ideal position) of the display image IM131_3 to be corrected. The CPU 111 determines the pixel position of the center PC121_3 of the display image IM131_3 to be corrected so that the center PC121_3 is positioned within the frame FR of the reference marker MK_3. As the amount of displacement, the CPU 111 calculates a difference DF2 between the pixel position of the center PC21_3 of the display image IM31_3 and the pixel position of the center PC121_3 of the display image IM131_3 to be corrected.

The left-side portion 2023 of the peripheral area 202, including the part 2023a, can fit within the display image IM131_3 to be corrected. The display image IM131_3 to be corrected corresponds to the recording pixel region R121 to be corrected.

In accordance with the determined amount of displacement, the camera ECU 110 executes control for correction of the recording pixel region R121 (S309), as illustrated in FIG. 14B.

The camera ECU 110 selects the vehicular camera 1 as a correction target from the vehicular cameras 1_1 to 1_4. The camera ECU 110 excludes the vehicular cameras 1_1, 1-2, and 1_4, each having a displacement amount of zero, and selects the vehicular camera 1_3 having a displacement amount greater than zero, as a correction target.

For the vehicular camera 1_3 as a correction target, the camera ECU 110 determines the position of the recording pixel region R121 corresponding to the position of the display image IM131_3 to be corrected, in accordance with the displacement amount calculated at S308.

Figure 15B:
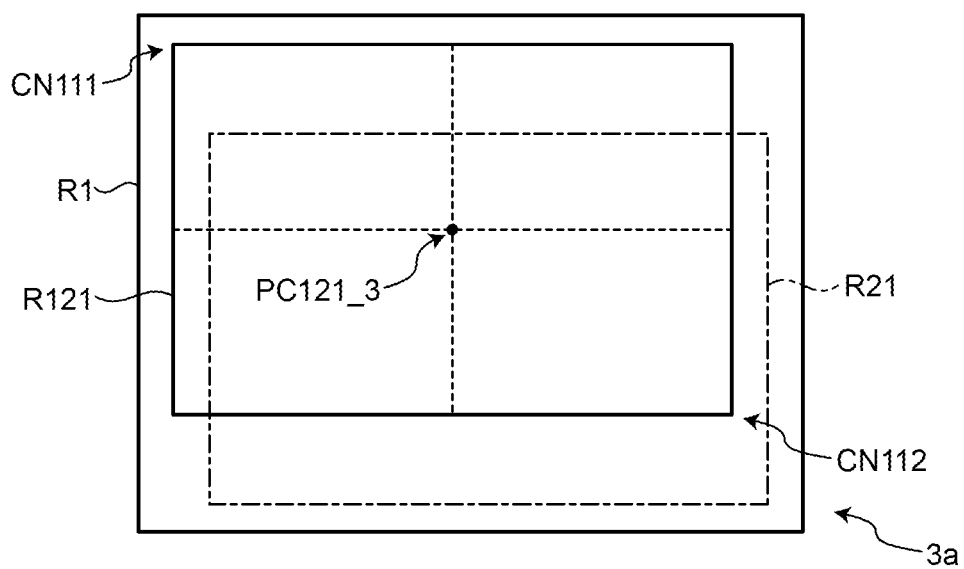

For example, as illustrated in FIG. 15A, the CPU 111 shifts the upper left corner CN11 of the display image IM31_3 by the difference DF2 to obtain a pixel position, and the obtained pixel position is regarded as the pixel position of the upper left corner CN111 of the image IM131. The CPU 111 shifts the lower right corner CN12 of the display image IM31_3 by the difference DF2 to obtain a pixel position, and the obtained pixel position is regarded as the pixel position of the lower right corner CN112 of the image IM131. Thus, as the position of the recording pixel region R121, the CPU 111 can determine the pixel position of the corner CN111 and the pixel position of the corner CN112. The pixel position of the corner CN111 and the pixel position of the corner CN112 respectively correspond to the pixel position of the corner CN111 and the pixel position of the corner CN112 in the effective pixel region R1 of the pixel array 3a of the vehicular camera 1_3, as illustrated in FIG. 15B. The pixel position of the corner CN111 and the pixel position of the corner CN112 indicate the position of the recording pixel region R121 to be corrected by the vehicular camera 1_3.

The camera ECU 110 issues a correction instruction and transmits the correction instruction and the position of the recording pixel region R121 (for example, the pixel position of the corner CN111 and the pixel position of the corner CN112) to the vehicular camera 1 as a control target via the decoder 112 and the cable 20.

In response to this, the vehicular camera 1 writes the position of the recording pixel region R121 into the non-volatile memory 5 (S320).

In the vehicular camera 1, upon receiving the correction instruction and the position of the recording pixel region R121, the encoder 8 transfers the correction instruction and the position of the recording pixel region R121 to the ISP 4. In accordance with the correction instruction, the ISP 4 writes the position of the recording pixel region R121 into the non-volatile memory 5 as a position of a pixel region to be read at start-up. The position of the pixel region to be read at start-up corresponds to the position of the recording pixel region R21 in the second embodiment. Into the non-volatile memory 5, the information on the pixel position of the corner CN111 and the pixel position of the corner CN112 of the effective pixel region R1 illustrated in FIG. 15B may be written as the position of the corrected recording pixel region R121.

This allows a subject to be imaged by each of the vehicular cameras 1_1, 1-2, 1_3, 1_4 to fit within the angle of view of a corresponding one of the display images IM31_1, 31_2, 131_3, 31_4, as illustrated in FIG. 14C. The image IM31_1 corresponding to the vehicular camera 1_1 can fit within the lower-side portion 2021 of the peripheral area 202. The right-side portion 2022 of the peripheral area 202 can fit within the image IM31_2 corresponding to the vehicular camera 1_2. The left-side portion 2023 of the peripheral area 202 can fit within the image IM131_3 of the vehicular camera 1_3. The upper-side portion 2024 of the peripheral area 202 can fit within the image IM31_4 of the vehicular camera 1_4.

Note that, although not illustrated, the processing at S309 and the processing at S320 are omitted for the vehicular camera 1 in which the amount of displacement is determined to be zero at S308.

An operation of the vehicular camera 1 is different from that according to the second embodiment in the following points, as illustrated in FIG. 16. FIG. 16 is a flowchart illustrating the operation of the vehicular camera 1 after calibration. In FIG. 16, a sequence on the left side indicates an operation of the shared camera ECU 110 and a sequence on the right side indicates an operation of the vehicular camera 1 corrected by calibration (S320).

After S101, S102, and S11 to S13 are performed in the same manner as that in the first embodiment, in the vehicular camera 1, the ISP 4 establishes communication with the non-volatile memory 5 via the control line 51 in response to the start of power supply by the power supply circuit 9. The ISP 4 reads information on the position of the corrected recording pixel region R121 from the non-volatile memory 5 (S314a). The ISP 4 holds the information on the position of the recording pixel region R121.

Figure 17A:
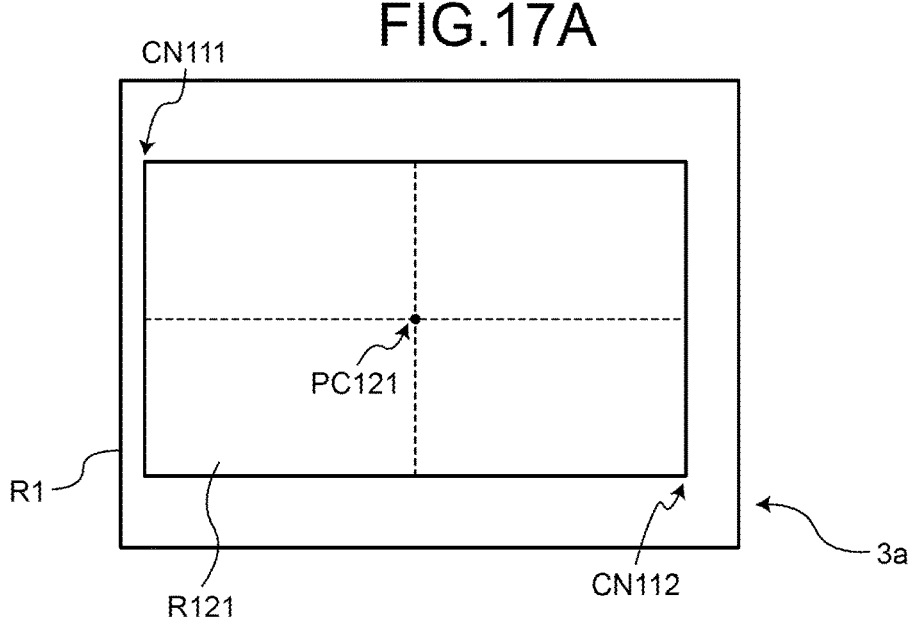
FIGS. 17A to 17C are diagrams each illustrating an operation of the vehicular camera according to the third embodiment.
Figure 17B:
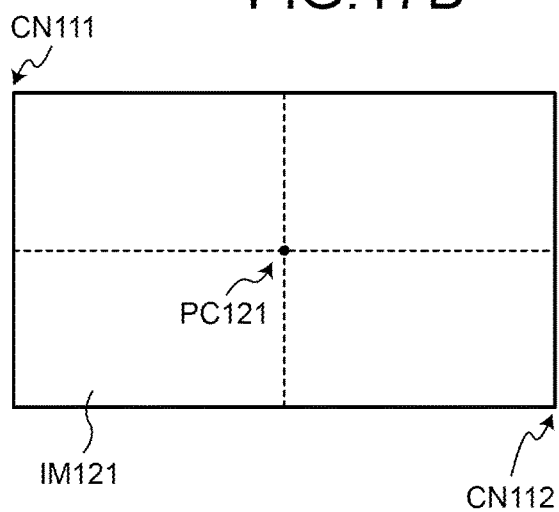
Figure 17C:
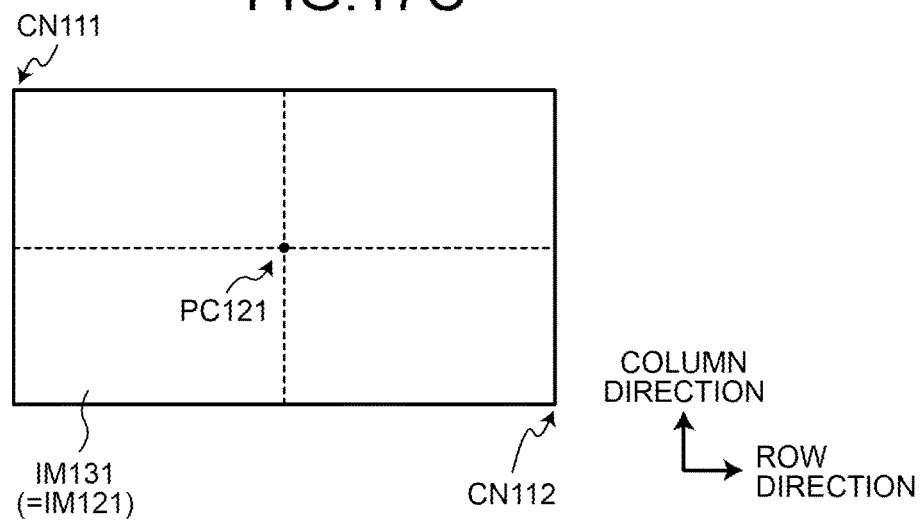

The ISP 4 sets the position of the corrected recording pixel region R121 in the effective pixel region R1 of the pixel array 3a (S314b). The ISP 4 acquires the position of the recording pixel region R121 from the non-volatile memory 5. The ISP 4 may acquire a pixel position of a portion representative of the recording pixel region R121 in the effective pixel region R1 as the position of the recording pixel region R121. The ISP 4 may acquire pixel positions of two corners diagonally opposite each other as the pixel position of the portion representative of the recording pixel region R121. For example, the ISP 4 may acquire the pixel position of the upper left corner CN111 and the pixel position of the lower right corner CN112 in FIG. 17A. FIG. 17A to FIG. 17C are diagrams illustrating the operation of the vehicular camera 1 according to the third embodiment.

The ISP 4 sets the position of the recording pixel region R121 to the position of the recording pixel region R121 read from the non-volatile memory 5. The ISP 4 may set the position of the recording pixel region R121 by adjusting the horizontal synchronous signal HREF, the vertical synchronous signal Vsync, the number of vertical blanking pixels $V_{111}$, $V_{112}$, and the like. Thus, as illustrated in FIG. 17A, the position of the recording pixel region R121 is set such that a subject to be imaged by the vehicular camera 1 fits within the angle of view of the display image IM31 corresponding to the subject.

Then, after S15, S103, and S16 are performed in the same manner as in the first embodiment, the ISP 4 controls the imaging sensor 3 to start an imaging operation in the vehicular camera 1. In response to this, as illustrated in FIG. 17A, the imaging sensor 3 acquires a subject image in the effective pixel region R1 corresponding to the entirety of the pixel array 3a, and selectively outputs a pixel signal from the recording pixel region R121 being a part of the effective pixel region R1. The position of the center PC21 of the recording pixel region R121 is such that a subject to be imaged by the vehicular camera 1 fits within the angle of view of the corresponding display image IM131 (see FIG. 15A).

The ISP 4 acquires a signal of the recording pixel region R121 from the imaging sensor 3. The ISP 4 applies predetermined processing to the signal of the recording pixel region R121 to generate the image IM121 of the recording pixel region R121 as illustrated in FIG. 17B. The position of the image IM121 is such that a subject to be imaged by the vehicular camera 1 fits within the angle of view of the corresponding display image IM131 (see FIG. 15A). The ISP 4 starts outputting the image (output image) IM121 and the position of the recording pixel region R121 to the camera ECU 110 via the encoder 8, the connector 7, and the cable 20 (S217).

The ISP 4 can output a pixel position of a portion representative of the recording pixel region R121 as the position of the recording pixel region R121. The ISP 4 can output pixel positions of two corners diagonally opposite each other as the pixel position of the portion representative of the recording pixel region R121. For example, the ISP 4 may output the pixel position of the upper left corner CN111 and the pixel position of the lower right corner CN112 in FIG. 17B.

In the camera ECU 110, the CPU 111 receives the image (output image) IM121 and the position of the recording pixel region R121 from the vehicular camera 1 via the cable 20 and the decoder 112. The CPU 111 generates a display image for outputting to a predetermined display, by using the image (output image) IM121 (S205).

The position of the recording pixel region R121 is set in the camera ECU 110 during calibration. The CPU 111 may confirm that the received position of the recording pixel region R121 is approximately in agreement with the position of the recording pixel region R121 set during calibration. In response to this, the CPU 111 may generate the display image IM131 by using the image IM121 as it is, as illustrated in FIG. 17B and FIG. 17C. The display image IM131 is an image having the same number of pixels (for example, $X_2 \times Y_2$) as that of the recording pixel region R121.

To generate the display image IM131, the image IM121 of the recording pixel region R121 is used as it is, whereby the CPU 111 can generate the display image IM131 (see FIG. 15A) allowing a subject as a target for imaging by the vehicular camera 1 to fit within the angle of view of the display image IM131. Thus, the image quality of the display image IM131 can be enhanced.

In the vehicular camera 1, while applying predetermined processing to the image IM121 to stabilize the image IM121 (S18), the ISP 4 outputs the image IM121 of the recording pixel region R121 and the position of the distortion center DC. The predetermined processing includes exposure adjustment, white balance adjustment, gain adjustment, gamma correction, and the like.

In the camera ECU 110, the CPU 111 supplies the display image IM131 to a predetermined display (for example, the display 102) in response to the stabilization of the image IM121 in the vehicular camera 1. The predetermined display displays the display image IM131 (S106).

As described above, in the third embodiment, the vehicular camera 1 receives the position of the recording pixel region R121 to be corrected from the camera ECU 110 via the cable 20 in accordance with the calibration. The vehicular camera 1 writes the position of the recording pixel region R121 to be corrected into the non-volatile memory 5 as a position of a pixel region to be read at start-up. Thus, the position of the recording pixel region R121 can be read from the non-volatile memory 5 in response to the start-up of the imaging sensor 3, and the output image of the recording pixel region R121 being a part of the effective pixel region R1 and the position of the recording pixel region R121 can be output to the camera ECU 110 via the cable 20. Thus, the output image can be transmitted to the camera ECU 110 via the cable 20 at a speed equal to or lower than the upper-limit frequency Fth, whereby a predetermined frame rate required for the vehicular camera 1 can be satisfied. In addition to the output image, the position of the recording pixel region R121 is transmitted to the camera ECU 110, whereby the camera ECU 110 can confirm that the position of the recording pixel region R121 is calibrated, and the display image IM131 can be generated by using the image IM121 of the recording pixel region R121 as it is. As a result, while the predetermined frame rate required for the vehicular camera 1 is satisfied, a display image allowing a subject as an imaging target to fit within the angle of view thereof can be displayed on a predetermined display (for example, the display 102).

In the third embodiment, the vehicular camera 1 receives a detection instruction from the camera ECU 110 via the cable 20 in response to the start-up of the imaging sensor. The vehicular camera 1 can output the output image including the reference marker and the position of the recording pixel region R21 to the camera ECU 110 via the cable 20 in accordance with the detection instruction. Thus, the camera ECU 110 can calculate the amount of displacement of the output image IM31 corresponding to the position of the recording pixel region R21 from an ideal position, and determine the position of the recording pixel region R121 to be corrected, and send the position of the recording pixel region R121 to the vehicular camera 1 together with a correction instruction. As a result, calibration can be performed with high accuracy.

Note 1

A vehicular camera including:
an imaging sensor including a first pixel region in a shape of a first quadrangle, the first pixel region having X1 pixels arranged in a first direction and Y1 pixels arranged in a second direction intersecting the first direction;
an optical system including at least one lens and having an optical axis intersecting the first pixel region of the imaging sensor; and
a memory configured to store a position of a second pixel region in a shape of a second quadrangle, the second pixel region being inside the first pixel region and having X2 pixels arranged in the first direction and Y2 pixels arranged in the second direction, the X2 being smaller than the X1, the Y2 being smaller than the Y1, wherein the vehicular camera is configured to:
  read the position of the second pixel region from the memory in response to start-up of the imaging sensor; and
  output an output image corresponding to the second pixel region from inside the first pixel region of the imaging sensor, while outputting the position of the second pixel region.

Note 2

The vehicular camera according to Note 1, wherein
the position of the second pixel region stored in the memory is expressed by a first pixel position at a first corner of the second pixel region and a second pixel position at a second corner diagonally opposite the first corner.

Note 3

The vehicular camera according to Note 1, wherein
a position of a center pixel in the second pixel region corresponds to a distortion center of the at least one lens.

Note 4

The vehicular camera according to Note 1, further including a processor, wherein
the processor is configured to:
  read the position of the second pixel region from the memory in response to the start-up of the imaging sensor; and
  output the output image corresponding to the second pixel region from inside the first pixel region of the imaging sensor, while outputting the position of the second pixel region.

Note 5

The vehicular camera according to Note 1, wherein
the first quadrangle is a first rectangle, and
the second quadrangle is a second rectangle.

Note 6

The vehicular camera according to Note 1, wherein
the first direction is a horizontal direction and
the second direction is a vertical direction.

Note 7

The vehicular camera according to Note 1, further including:
a circuit board on which the imaging sensor is mounted; and
a housing, wherein
the housing houses at least the imaging sensor, the circuit board, and the memory.

Note 8

The vehicular camera according to Note 7, further including a processor, wherein
the housing includes a connector,
the connector includes at least two terminals electrically connecting an interior to an exterior of the housing,
at least one terminal of the at least two terminals is electrically connected to the processor, and
the at least one terminal of the connector is configured to output the output image corresponding to the second pixel region.

Note 9

The vehicular camera according to Note 8, wherein
a side of the at least two terminals of the connector facing outside the exterior of the housing is configured to be connected to a cable connected to a constituent, other than the vehicular camera, of a vehicle.

Note 10

The vehicular camera according to Note 9, wherein
the cable is a twist-pair cable and conforms to a car camera bus (C2B (registered trademark)) standard.

Effect of Embodiment

The vehicular camera according to the present disclosure allows an image to be efficiently transferred to the vehicle side.

Item 1

A vehicular camera including:
an imaging sensor including a first pixel region in a shape of a first quadrangle, the first pixel region having X1 pixels arranged in a first direction and Y1 pixels arranged in a second direction intersecting the first direction;
an optical system including at least one lens and having an optical axis intersecting the first pixel region of the imaging sensor;
a memory configured to store a first position of a second pixel region in a shape of a second quadrangle, the second pixel region being inside the first pixel region and having X2 pixels arranged in the first direction and Y2 pixels arranged in the second direction;
an output circuit configured to read the first position of the second pixel region from the memory in response to start-up of the imaging sensor, and output an output image corresponding to the second pixel region from inside the first pixel region of the imaging sensor while outputting the first position of the second pixel region; and
an input circuit configured to receive input about a second position of a third pixel region in a shape of a third quadrangle, the third pixel region being inside the first pixel region and having X3 pixels arranged in the first direction and Y3 pixels arranged in the second direction,
wherein the vehicular camera is configured to store the second position of the third pixel region in the shape of the third quadrangle in the memory, as the first position of the second pixel region in the shape of the second quadrangle.

Item 2

The vehicular camera according to Item 1, wherein
the start-up is set as first start-up, and
the vehicular camera is configured to, in response to second start-up of the imaging sensor after the first start-up, read the second position of the third pixel region from the memory, and the output circuit is configured to output an output image corresponding to the third pixel region from inside the first pixel region of the imaging sensor and the second position of the third pixel region.

Item 3

The vehicular camera according to Item 1, wherein
X2 is smaller than X1, and
Y2 is smaller than Y1.

Item 4

The vehicular camera according to Item 3, wherein
X2 and X3 are equal to each other, and
Y2 and Y3 are equal to each other.

Item 5

The vehicular camera according to Item 1, wherein
a position of the second pixel region stored in the memory is expressed by a first pixel position at a first corner of the second pixel region and a second pixel position at a second corner diagonally opposite the first corner, and
a position of the third pixel region stored in the memory is expressed by a third pixel position at a third corner of the third pixel region and a fourth pixel position at a fourth corner diagonally opposite the third corner.

Item 6

The vehicular camera according to Item 1, further including:
a processor,
wherein the processor is configured to receive the position of the third pixel region, and stores the position of the third pixel region in the memory in place of the position of the second pixel region.

Item 7

The vehicular camera according to Item 1, wherein
the first quadrangle is a first rectangle,
the second quadrangle is a second rectangle, and
the third quadrangle is a third rectangle.

Item 8

The vehicular camera according to Item 1, wherein
the first direction is a horizontal direction and
the second direction is a vertical direction.

Item 9

The vehicular camera according to Item 1, further including:
a circuit board on which the imaging sensor is mounted; and
a housing, wherein
the housing houses at least the imaging sensor, the circuit board, and the memory.

Item 10

The vehicular camera according to Item 9, wherein
the housing includes a connector,
the connector includes at least two terminals electrically connecting an interior to an exterior of the housing, and
at least one of the at least two terminals is electrically connected to the input circuit and/or the output circuit.

Item 11

The vehicular camera according to Item 10, wherein
sides of the at least two terminals of the connector facing outside the exterior of the housing are configured to be connected to a cable connected to a constituent, other than the vehicular camera, of a vehicle.

Item 12

The vehicular camera according to Item 11, wherein
the cable is a twist-pair cable and conforms to a car camera bus (C2B (registered trademark)) standard.

Effect of Embodiment

The vehicular camera according to the present disclosure allows an image to be efficiently transferred to the vehicle side.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:
1. A vehicular camera comprising:
an imaging sensor including a first pixel region in a shape of a first quadrangle, the first pixel region having X1 pixels arranged in a first direction and Y1 pixels arranged in a second direction intersecting the first direction;
an optical system including at least one lens and having an optical axis intersecting the first pixel region of the imaging sensor; and
a memory configured to store a position of a second pixel region in a shape of a second quadrangle, the second pixel region being inside the first pixel region and having X2 pixels arranged in the first direction and Y2 pixels arranged in the second direction, the X2 being smaller than the X1, the Y2 being smaller than the Y1, wherein
the vehicular camera is configured to:
read the position of the second pixel region from the memory in response to start-up of the imaging sensor; and
output an output image corresponding to the second pixel region from inside the first pixel region of the imaging sensor, while outputting the position of the second pixel region.
2. The vehicular camera according to claim 1, wherein
the position of the second pixel region stored in the memory is expressed by a first pixel position at a first corner of the second pixel region and a second pixel position at a second corner diagonally opposite the first corner.

3. The vehicular camera according to claim 1, wherein a position of a center pixel in the second pixel region corresponds to a distortion center of the at least one lens.

4. The vehicular camera according to claim 1, further comprising a processor, wherein
the processor is configured to:
read the position of the second pixel region from the memory in response to the start-up of the imaging sensor; and
output the output image corresponding to the second pixel region from inside the first pixel region of the imaging sensor, while outputting the position of the second pixel region.

5. The vehicular camera according to claim 1, wherein
the first quadrangle is a first rectangle, and
the second quadrangle is a second rectangle.

6. The vehicular camera according to claim 1, wherein
the first direction is a horizontal direction and
the second direction is a vertical direction.

7. The vehicular camera according to claim 1, further comprising:
a circuit board on which the imaging sensor is mounted; and
a housing, wherein
the housing houses at least the imaging sensor, the circuit board, and the memory.

8. The vehicular camera according to claim 7, further comprising a processor, wherein
the housing includes a connector,
the connector includes at least two terminals electrically connecting an interior to an exterior of the housing,
at least one terminal of the at least two terminals is electrically connected to the processor, and
the at least one terminal of the connector is configured to output the output image corresponding to the second pixel region.

9. The vehicular camera according to claim 8, wherein
sides of the at least two terminals of the connector facing outside the exterior of the housing are configured to be connected to a cable connected to a constituent, other than the vehicular camera, of a vehicle.

10. The vehicular camera according to claim 9, wherein
the cable is a twist-pair cable and conforms to a car camera bus (C2B (registered trademark)) standard.

* * * * *